US012146368B2

(12) United States Patent
MacKarvich

(10) Patent No.: US 12,146,368 B2
(45) Date of Patent: Nov. 19, 2024

(54) PARAPET DESCENT APPARATUS

(71) Applicant: Charles J. MacKarvich, Atlanta, GA (US)

(72) Inventor: Charles J. MacKarvich, Atlanta, GA (US)

( * ) Notice: Subject to any disclaimer, the term of this patent is extended or adjusted under 35 U.S.C. 154(b) by 0 days.

(21) Appl. No.: 17/578,311

(22) Filed: Jan. 18, 2022

(65) Prior Publication Data

US 2022/0136327 A1 May 5, 2022

Related U.S. Application Data

(63) Continuation of application No. 17/075,942, filed on Oct. 21, 2020.

(60) Provisional application No. 62/969,388, filed on Feb. 3, 2020, provisional application No. 62/968,705, filed on Jan. 31, 2020.

(51) Int. Cl.

| | |
|---|---|
| ***E06C 7/48*** | (2006.01) |
| ***A62B 35/00*** | (2006.01) |
| ***E06C 7/18*** | (2006.01) |
| *E06C 1/06* | (2006.01) |

(52) U.S. Cl.

CPC .............. *E06C 7/48* (2013.01); *A62B 35/005* (2013.01); *E06C 7/186* (2013.01); *E06C 1/06* (2013.01)

(58) Field of Classification Search

CPC ... E06C 7/48; E06C 7/484; E06C 1/04; E06C 7/186; E06C 7/188; A62B 35/005; A62B 35/04; A62B 35/0093; A62B 35/0056

See application file for complete search history.

(56) References Cited

U.S. PATENT DOCUMENTS

| | | | | |
|---|---|---|---|---|
| 1,467,597 A | | 9/1923 | Wendel | |
| 2,526,071 A | | 10/1950 | Estey | |
| 2,845,206 A | | 4/1954 | Currie | |
| 3,012,626 A | * | 12/1961 | Marryatt | E06C 9/14 182/84 |
| 3,115,211 A | | 12/1963 | Ostrander, Jr. | |
| 3,523,591 A | | 8/1970 | Fountain | |

(Continued)

FOREIGN PATENT DOCUMENTS

| | | | | |
|---|---|---|---|---|
| AT | 398228 B | * | 8/1994 | A62B 5/00 |
| DE | 202013006653 | | 10/2013 | |

(Continued)

OTHER PUBLICATIONS

US 11,261,665 B2, 03/2022, Mackarvich (withdrawn)
US 11,459,825 B2, 10/2022, Mackarvich (withdrawn)
Quick Release Pins, accessed from https://monroeengineering.com/products-quick-release-pins.php, available as of Jun. 14, 2017 (Year: 2017).*
Mackarvich, Charles J.; Applicant-Initiated Interview Summary for U.S. Appl. No. 17/075,879, filed Oct. 21, 2020, mailed Apr. 20, 2022, 3 pgs.

(Continued)

*Primary Examiner* — Daniel P Cahn
*Assistant Examiner* — Jeremy C Ramsey
(74) *Attorney, Agent, or Firm* — Buchalter

(57) ABSTRACT

A parapet descent apparatus can include a mounting panel configured to be secured to the parapet of an elevated structure; and a parapet ladder secured to the mounting panel and including: a first ladder rail; a second ladder rail; and a plurality of rungs, each of the plurality of rungs extending from the first ladder rail to the second ladder rail, the parapet ladder defining a first end configured to be secured to the parapet of the elevated structure and a second end distal from the first end and configured to contact a surface of the elevated structure, a top surface of the parapet being offset above the surface of the elevated structure by a wall height of the parapet.

21 Claims, 19 Drawing Sheets

(56) References Cited

U.S. PATENT DOCUMENTS

| | | | | |
|---|---|---|---|---|
| 3,598,200 | A | 8/1971 | Thompson | |
| 3,902,700 | A | 9/1975 | Cox | |
| 3,908,791 | A | 9/1975 | Kleine et al. | |
| RE30,072 | E | 8/1979 | Kleine et al. | |
| 4,193,475 | A | 3/1980 | Sweet et al. | |
| 4,399,890 | A | 8/1983 | Bartels et al. | |
| 4,546,855 | A | 10/1985 | Lyons | |
| 4,709,783 | A | 12/1987 | Tomioka et al. | |
| 4,765,439 | A * | 8/1988 | Kresmery | E06C 7/48 182/206 |
| 4,813,515 | A | 3/1989 | Wigington | |
| 5,165,642 | A | 11/1992 | Rihaly | |
| 5,497,848 | A | 3/1996 | Travis | |
| 5,743,356 | A | 4/1998 | Mitchell | |
| D401,354 | S | 11/1998 | LaValle | |
| 5,845,741 | A | 12/1998 | Dwyer | |
| 5,911,287 | A | 6/1999 | Campbell | |
| 5,918,698 | A | 7/1999 | Lunn | |
| 5,975,242 | A | 11/1999 | Woller et al. | |
| D426,896 | S | 6/2000 | Brown | |
| 6,533,069 | B1 * | 3/2003 | Couillard | E06C 7/48 182/83 |
| 6,578,665 | B1 | 6/2003 | DeBaca et al. | |
| 6,722,469 | B1 | 4/2004 | Weger, Jr. | |
| 6,926,120 | B1 | 8/2005 | Bradley | |
| 7,093,689 | B2 | 8/2006 | Poldmaa | |
| 7,600,610 | B2 | 10/2009 | Deuer | |
| 7,637,350 | B2 | 12/2009 | Conroy | |
| 7,950,497 | B2 | 5/2011 | Horton | |
| D715,964 | S | 10/2014 | Von Hebestreit | |
| 8,875,839 | B1 | 11/2014 | Licea et al. | |
| 9,080,383 | B2 | 7/2015 | Meillet | |
| 9,194,129 | B2 | 11/2015 | O'Donnell | |
| 9,784,034 | B2 | 10/2017 | Short | |
| D810,960 | S | 2/2018 | Umlor | |
| D830,577 | S | 10/2018 | Umlor | |
| 10,486,002 | B1 | 11/2019 | Drinkwater | |
| D872,879 | S | 1/2020 | Lenci | |
| D884,924 | S | 5/2020 | Lenci | |
| 10,883,310 | B2 | 1/2021 | Johnson et al. | |
| 10,940,338 | B1 | 3/2021 | Miller et al. | |
| 11,021,316 | B2 | 6/2021 | Castro et al. | |
| 11,085,238 | B1 | 8/2021 | Bancroft | |
| 11,125,016 | B2 | 9/2021 | Adams et al. | |
| 11,136,824 | B2 | 10/2021 | James, Jr. | |
| 11,313,174 | B2 | 4/2022 | Mackarvich | |
| 11,492,849 | B2 | 11/2022 | Mackarvich | |
| 2003/0213646 | A1 | 11/2003 | Gallion | |
| 2005/0045421 | A1 * | 3/2005 | Gaines | E06C 7/482 182/107 |
| 2006/0000674 | A1 * | 1/2006 | McIntire | E06C 7/186 182/129 |
| 2007/0023232 | A1 | 2/2007 | Eastwood et al. | |
| 2007/0158137 | A1 | 7/2007 | Petersen | |
| 2007/0278037 | A1 | 12/2007 | Michel et al. | |
| 2009/0000868 | A1 | 1/2009 | Gaines | |
| 2010/0326768 | A1 | 12/2010 | Kerstetter, Jr. | |
| 2015/0204140 | A1 | 7/2015 | Umlor et al. | |
| 2015/0226002 | A1 | 8/2015 | Johansen | |
| 2015/0252619 | A1 | 9/2015 | Kramer | |
| 2016/0208555 | A1 * | 7/2016 | Dehoff | E06C 7/48 |
| 2017/0058605 | A1 | 3/2017 | Napolitano | |
| 2018/0274295 | A1 | 9/2018 | Adams et al. | |
| 2019/0169934 | A1 | 6/2019 | Adams | |
| 2019/0330921 | A1 | 10/2019 | James, Jr. | |
| 2019/0338593 | A1 | 11/2019 | Knickrehm et al. | |
| 2021/0046340 | A1 | 2/2021 | Miller et al. | |
| 2021/0238924 | A1 | 8/2021 | Mackarvich | |
| 2021/0238925 | A1 | 8/2021 | Mackarvich | |
| 2022/0389760 | A1 | 12/2022 | Mackarvich | |

FOREIGN PATENT DOCUMENTS

| | | | | |
|---|---|---|---|---|
| EP | 3859121 | A1 * | 8/2021 | E06C 1/06 |
| FR | 3029560 | A1 * | 6/2016 | A62B 5/00 |
| FR | 3054592 | | 2/2018 | |
| WO | WO-2005044384 | A1 * | 5/2005 | A62B 35/0068 |

OTHER PUBLICATIONS

Mackarvich, Charles J.; Notice of Allowance for U.S. Appl. No. 17/075,879, filed Oct. 21, 2020, mailed May 19, 2022, 15 pgs.

Mackarvich, Charles J.; Applicant-Initiated Interview Summary for U.S. Appl. No. 17/075,879, filed Oct. 21, 2020, mailed Nov. 12, 2021, 2 pgs.

Mackarvich, Charles J.; Applicant-Initiated Interview Summary for U.S. Appl. No. 17/075,879, filed Oct. 21, 2020, mailed Jun. 10, 2021, 2 pgs.

Mackarvich, Charles J.; Final Office Action for U.S. Appl. No. 17/075,879, filed Oct. 21, 2020, mailed Jun. 24, 2021, 21 pgs.

Mackarvich, Charles J.; Non-Final Office Action for U.S. Appl. No. 17/075,879, filed Oct. 21, 2020, mailed Jan. 28, 2022, 22 pgs.

Mackarvich, Charles J.; Non-Final Office Action for U.S. Appl. No. 17/075,879, filed Oct. 21, 2020, mailed Mar. 12, 2021, 16 pgs.

Mackarvich, Charles J.; Notice of Pre-AIA or AIA Status for U.S. Appl. No. 17/075,879, filed Oct. 21, 2020, mailed Oct. 22, 2021, 5 pgs.

Mackarvich, Charles J.; Requirement for Restriction/Election for U.S. Appl. No. 17/075,879, filed Oct. 21, 2020, mailed Jan. 4, 2021, 8 pgs.

3M; Instruction Manual for LAD-SAF Flexible Cable Vertical Safety Systems, Copyright 2019, 225 pgs.

Mackarvich, Charles J.; Applicant-Initiated Interview Summary for U.S. Appl. No. 17/075,942, filed Oct. 21, 2020, mailed Jun. 15, 2021, 2 pgs.

Mackarvich, Charles J.; Applicant-Initiated Interview Summary for U.S. Appl. No. 17/075,942, filed Oct. 21, 2020, mailed Sep. 10, 2021, 3 pgs.

Mackarvich, Charles J.; Non-Final Office Action for U.S. Appl. No. 17/075,942, filed Oct. 21, 2020, mailed Mar. 16, 2021, 14 pgs.

Mackarvich, Charles J.; Non-Final Office Action for U.S. Appl. No. 17/075,942, filed Oct. 21, 2020, mailed Jul. 19, 2021, 19 pgs.

Mackarvich, Charles J.; Notice of Allowance for U.S. Appl. No. 17/075,942, filed Oct. 21, 2020, mailed Oct. 20, 2021, 18 pgs.

Mackarvich, Charles J.; Requirement for Restriction/Election for U.S. Appl. No. 17/075,942, filed Oct. 21, 2020, mailed Jan. 12, 2021, 9 pgs.

Mackarvich, Charles J.; Supplemental Notice of Allowance for U.S. Appl. No. 17/075,942, filed Oct. 21, 2020, mailed Nov. 23, 2021, 8 pgs.

OCM; Specification Sheet for Coil Wing Nut, publicly available prior to Feb. 3, 2020, 1 pg.

Mackarvich, Charles J.; Non-Final Office Action for U.S. Appl. No. 17/890,999, filed Aug. 18, 2022, mailed Mar. 20, 2023, 40 pgs.

Mackarvich, Charles J.; Applicant-Initiated Interview Summary for U.S. Appl. No. 17/890,999, filed Aug. 18, 2022, mailed Jun. 21, 2023, 2 pgs.

Mackarvich, Charles J.; Final Office Action for U.S. Appl. No. 17/890,999, filed Aug. 18, 2022, mailed Jul. 7, 2023, 26 pgs.

Mackarvich, Charles J.; Non-Final Office Action for U.S. Appl. No. 17/890,999, filed Aug. 18, 2022, mailed Jan. 23, 2024, 16 pgs.

MacKarvich, Charles J.; Final Office Action for U.S. Appl. No. 17/890,999, filed Aug. 18, 2022, mailed May 13, 2024, 19 pgs.

MacKarvich, Charles J.; Notice of Allowance for U.S. Appl. No. 17/890,999, filed Aug. 18, 2022, mailed Jul. 31, 2024, 11 pgs.

* cited by examiner

PARAPET DESCENT APPARATUS

REFERENCE TO RELATED APPLICATIONS

This application is a continuation of U.S. Application Ser. No. 17/075,942, filed Oct. 21, 2020, which claims the benefit of U.S. Provisional Application No. 62/969,388, filed Feb. 3, 2020, and U.S. Provisional Application No. 62/968,705, filed Jan. 31, 2020, each of which is hereby specifically incorporated by reference herein in its entirety.

TECHNICAL FIELD

Field of Use

This disclosure relates to fall arrest systems. More specifically, this disclosure relates to fall arrest systems for use with ladders, including portable ladders.

Related Art

Ladders are commonly used to reach portions of an elevated structure not otherwise accessible. Ladders are useful for reaching such an elevated structure to, for example only, perform maintenance and repair or as part of a building process, and are often used only temporarily and therefore portable. Portable ladders—especially in an extended condition where the elevated structure is quite high off the ground—are by definition not generally fixed to either the ground or to the elevated structure. Such ladders generally depend on gravity, friction, and the care taken by the user of the ladder for their stability, even under varying loads. Where available, a fall arrest system can protect a user's misstep from turning into a serious injury or worse; however, such a system is usually not available or practical for some types of ladders including the aforementioned portable ladders.

Once a ladder is used to access an elevated structure, passing through, over, or around the ladder and safely descending to a surface of the elevated structure can present its own challenges, especially when a parapet is defined at or near an edge of the elevated structure.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a parapet descent apparatus comprising: a mounting panel configured to be secured to the parapet of an elevated structure; and a parapet ladder secured to the mounting panel and comprising: a first ladder rail; a second ladder rail; and a plurality of rungs, each of the plurality of rungs extending from the first ladder rail to the second ladder rail, the parapet ladder defining a first end configured to be secured to the parapet of the elevated structure and a second end distal from the first end and configured to contact a surface of the elevated structure, a top surface of the parapet being offset above the surface of the elevated structure by a wall height of the parapet.

In a further aspect, disclosed is a method of using a parapet descent apparatus to access an elevated structure, the method comprising: securing a mounting panel to a parapet of the elevated structure; securing a parapet ladder to the mounting panel, the parapet ladder comprising: a first ladder rail; a second ladder rail; and a plurality of rungs, each of the plurality of rungs extending from the first ladder rail to the second ladder rail, the parapet ladder defining a first end configured to be secured to the parapet of the elevated structure and a second end distal from the first end and configured to contact a surface of the elevated structure, a top surface of the parapet being offset above the surface of the elevated structure by a wall height of the parapet; and securing a portable, rigid main ladder to the parapet proximate to each of the mounting panel and the ladder parapet, the mounting panel and the parapet ladder configured for passage of a user of the parapet descent apparatus from the ladder to the parapet ladder.

In yet another aspect, disclosed is a system comprising: an upper anchor configured to be secured to an upward-facing surface of an elevated structure proximate to a portable, rigid ladder accessing the elevated structure, the surface of the elevated structure being one of a horizontal surface and a surface sloped with respect to a horizontal orientation of the system and not defined by the ladder, the upper anchor comprising a shock absorber; a lower anchor comprising a first portion and a second portion slideably secured to the first portion, the first portion and the second portion configured to receive the ladder therebetween, the lower anchor configured to not rotate with respect to the ladder; and a cable configured to extend from the upper anchor to the lower anchor, the cable configured to receive a cable sleeve configured to tether a user to the cable, the cable further configured to allow movement of the cable sleeve to any position between the upper anchor and the lower anchor.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
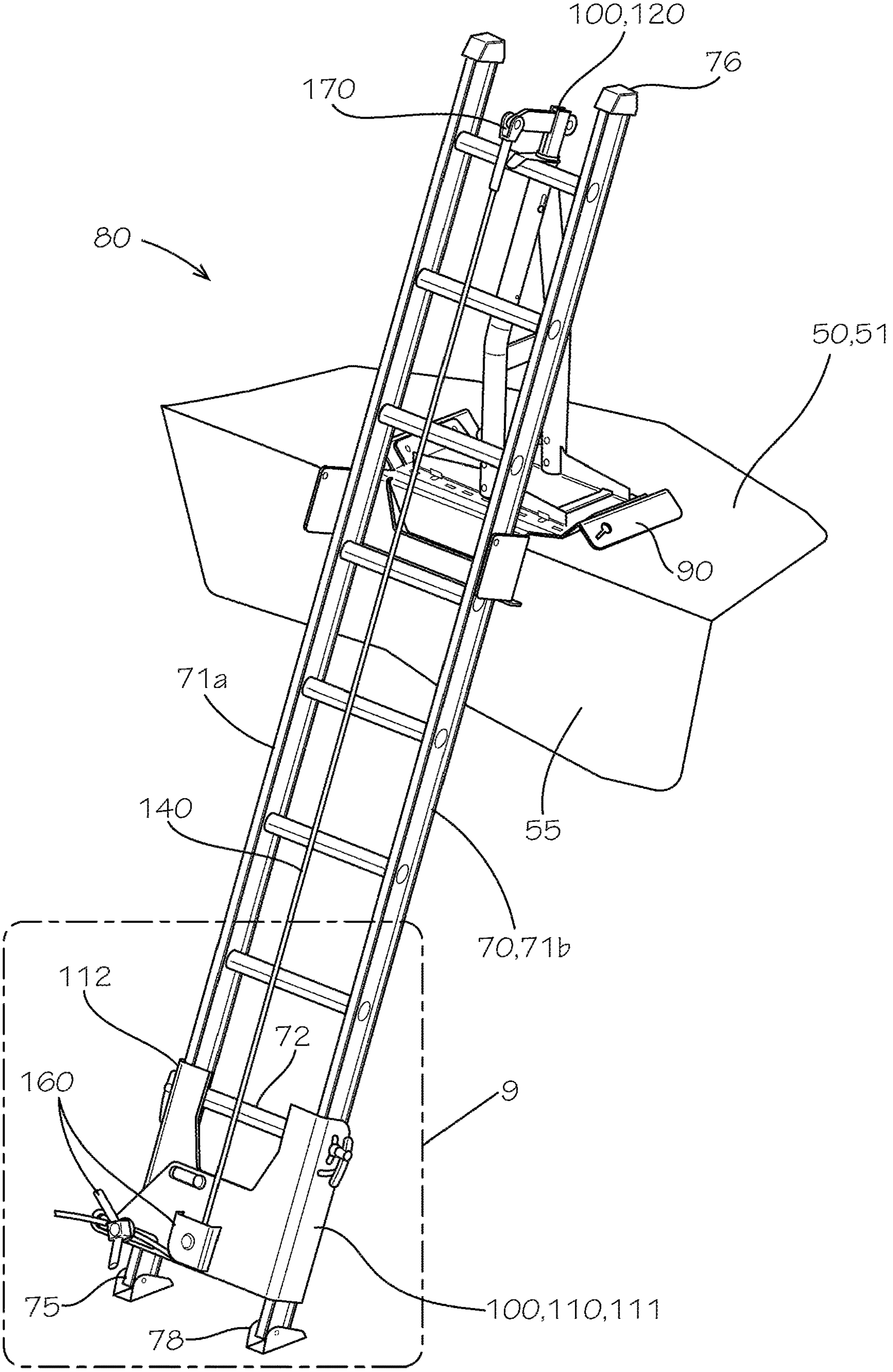
FIG. 1 is a front perspective view of a fall arrest system showing a ladder positioned in a leaning orientation against a ladder dock of the fall arrest system in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the system and ladder nearest to and occupied by a user of the system when the user is climbing up the ladder; "rear" is that end of the system and ladder that is opposite or distal the front; "left" is that which is to the left of or facing left from the user climbing up the ladder and facing towards the front; and "right" is that which is to the right of or facing right from the same user climbing up the ladder and facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a fall arrest device and associated methods, systems, devices, and various apparatuses are disclosed herein. In one aspect, the fall arrest device can comprise an anchor and a cable.

FIG. 1 shows a front perspective view of a fall arrest system 80 in accordance with one aspect of the current disclosure. The fall arrest system 80 can comprise a ladder 70 configured to provide access to an elevated structure 50. In some aspects, as shown, the ladder 70 can be configured to lean against a vertical, first, or outer side surface 55 or other surface of the elevated structure 50 or against a structure such that the ladder 70 can provide access to the elevated structure 50. More specifically, the ladder 70 can define a pair of rails 71*a,b* and a plurality of ladder rungs 72. The pair of rails 71*a,b* can extend from a first end 75 of the ladder to a second end 76 of the ladder 70 distal from the first end 75, and each of the plurality of ladder rungs 72 can extend from a first rail 71*a* of the pair of rails 71*a,b* to a second rail 71*b* of the pair of rails 71*a,b*. Feet 78, which can be adjustable, can be attached to and can stabilize the rails 71*a,b* and a base of the ladder 70 and the ladder 70 generally on a lower surface 2001 (shown in FIG. 17). The feet 78 can be configured to rotate and sit flat on even uneven ground or penetrate the ground to further secure the ladder 70. In some aspects, the ladder 70 can be permanently secured to the elevated structure 50 and need not lean at angle against the elevated structure 50. The ladder 70 can and typically will extend above a surface 51 of the elevated structure 50 by a minimum distance. This minimum distance can be, for example and without limitation, 36 inches (approximately 914 millimeters).

A fall arrest device 100 of the fall arrest system 80 can comprise either or both of a lower anchor 110 and an upper anchor 120. The lower anchor 110 can be assembled to and optionally, as shown, nested within or about the ladder 70. The lower anchor 110 can comprise a first portion 111 and a second portion 112. The upper anchor 120 can be assembled, directly or indirectly, to the surface 51 of the elevated structure 50. In some aspects, the upper anchor 120 can be assembled to a ladder dock 90, which itself can be assembled to the surface 51 of the elevated structure 50. In other aspects, the upper anchor 120 can be directly assembled to the surface 51 of the elevated structure 50.

A cable 140 can extend from the lower anchor 110 or the first end 75 or a portion proximate to the first end 75 of the ladder 70 to the upper anchor 120 or the second end 76 or a portion proximate to the second end 76 of the ladder 70. More specifically, the cable 140 can extend along a longitudinal direction of the ladder 70 and can be offset at least slightly from the ladder 70. As a position of either of the lower anchor 110 and the upper anchor 120 is adjusted, a tension in the cable 140 can be maintained by use of a cable attachment 160 proximate to or incorporated into the lower anchor 110 and/or a cable attachment 170 proximate to or incorporated into the upper anchor 120. In some aspects, a cable attachment like the cable attachments 160, 170 can comprise a cable coupling like the cable attachment 170 shown. In some aspects, a cable attachment like the cable attachment 160, 170 can comprise a more complex—and adjustable—mechanism like the cable attachment 160 shown. In any case, as will be described below, a user of the ladder 70 can connect himself or herself to the cable 140 and thereby receive passive fall protection.

Figure 2:
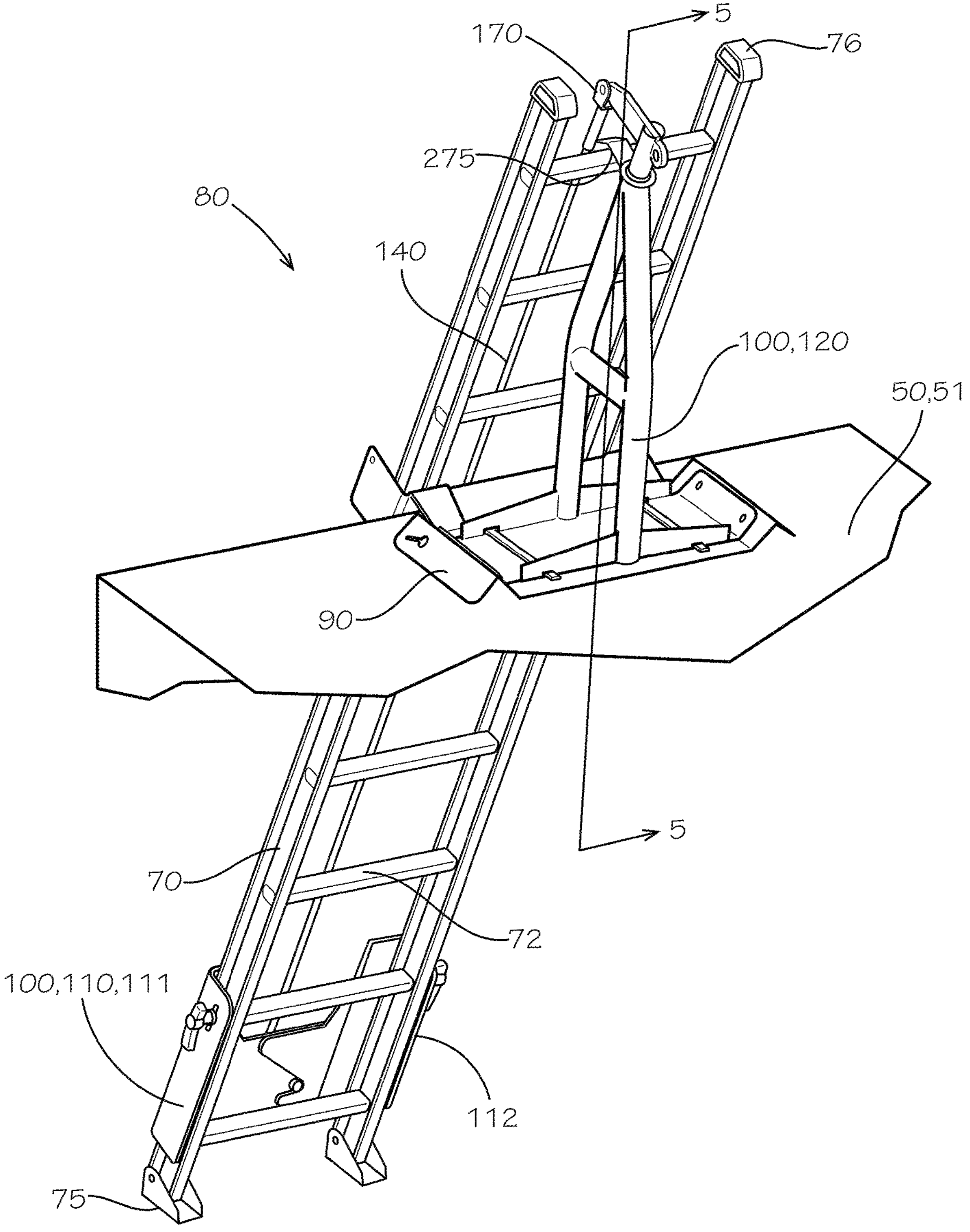
FIG. 2 is a rear perspective view of the fall arrest system of FIG. 1.

FIG. 2 is a rear perspective view of the fall arrest system 80. As shown, the upper anchor 120 can be engaged with the ladder 70 in an engaged position. More specifically, the upper anchor 120 of the fall arrest device 100 can define a ladder bracket or engagement bracket 275. A surface of the engagement bracket 275 can hook around or catch on the ladder 70 and thereby prevent or resist movement of the ladder 70 by retaining or maintaining in the engaged position with a bent or formed flange 277 (shown in FIG. 3) of the engagement bracket 275 one of the plurality of ladder rungs 72 of the ladder 70 positioned proximate to the second end 76 of the ladder 70. In some aspects, the flange 277 can be a separate component from a remaining portion of the engagement bracket 275.

Figure 3:
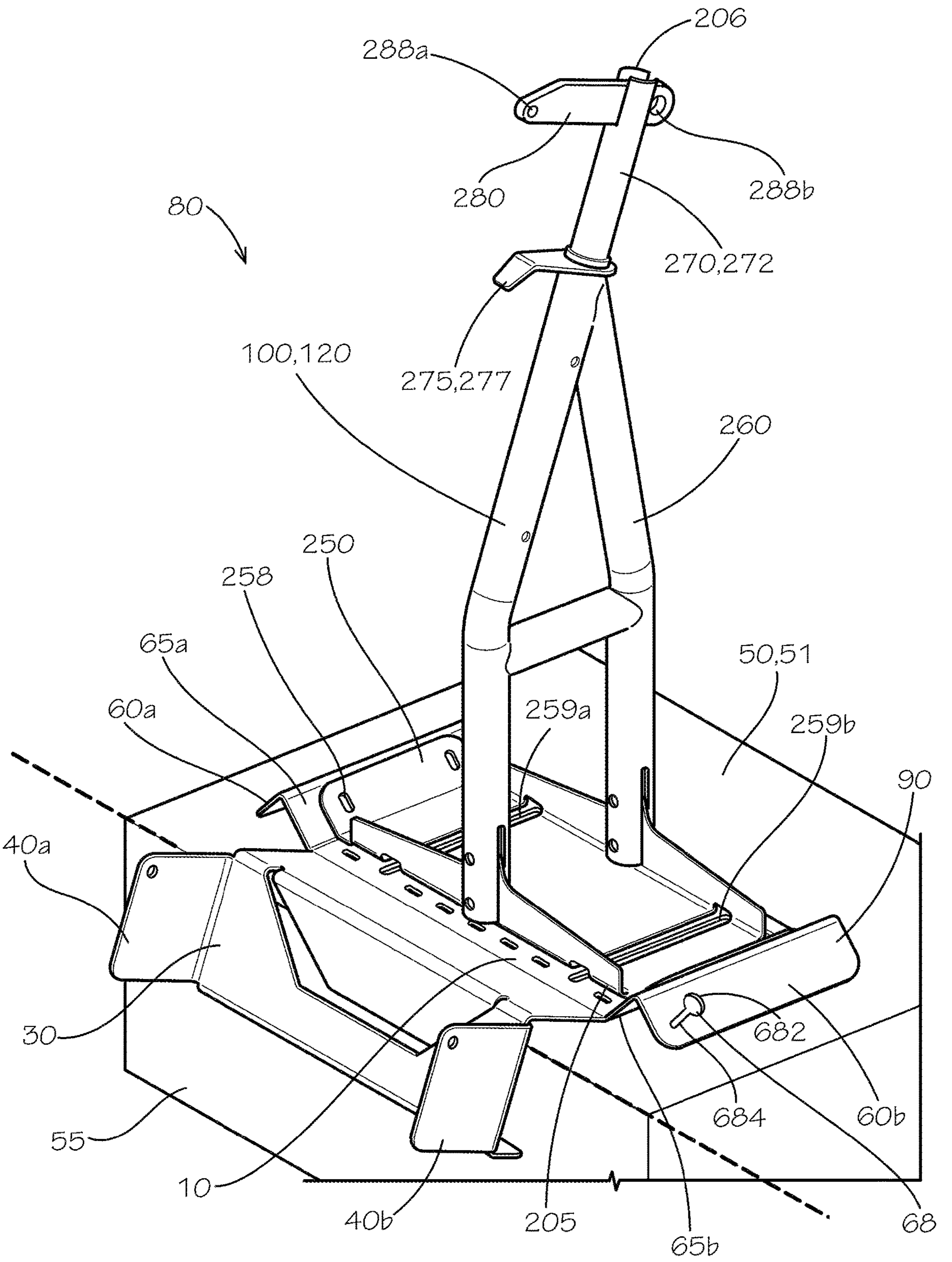
FIG. 3 is a front perspective view of an upper anchor of a fall arrest device of the fall arrest system of FIG. 1 shown partially assembled to the ladder dock of FIG. 1.

FIG. 3 shows a front perspective view of the upper anchor 120 of the fall arrest device 100 of the fall arrest system 80 shown partially assembled to the ladder dock 90. The ladder dock can comprise a mounting panel 10, a connecting panel 20, a ladder rest panel 30, and ears 40*a,b*. As shown, the connecting panel 20 can extend from the mounting panel 10, the ladder rest panel 30 can extend from the connecting panel 20, and the ears 40*a,b* can extend from the ladder rest panel 30. As also shown, the upper anchor 120 can assemble to and optionally nest within or about the ladder dock 90. In some aspects, additional connecting panels 65*a,b* can be bent with respect to the mounting panel 10 at an angle of more than 90 degrees (e.g., 135 degrees), which can facilitate installation of the upper anchor 120 even with inexact tolerances for the mating parts. Likewise, auxiliary panels 60*a,b* can be bent with respect to the respective connecting panels 65*a,b* and with respect to the mounting panel 10 as desired to facilitate access to and use of openings 68 as well as to facilitate an interface with any neighboring portions of the ladder dock 90 or the elevated structure 50. Each of the retaining openings 68 can comprise or define a larger portion 682 and a smaller portion 684. In some aspects, the auxiliary panels 60*a,b* can be bent with respect to the mounting panel 10 at an angle of 90 degrees.

The upper anchor 120 can comprise a base 250 defining mounting openings 258 for securing the upper anchor 120 to the ladder dock 90. As also shown, the base 250 can define clearance slots 259*a,b* to avoid interference with any fasteners (not shown) securing the ladder dock 90 to the elevated structure 50. The upper anchor 120 can comprise a frame 260, which can extend from the base 250 or further define the base 250 in a vertical direction away from the surface 51 of the elevated structure 50. The frame 260, which can be formed from a plurality of separate members as shown, can comprise the engagement bracket 275 defining the flange 277 for contacting and retaining a portion of the ladder 70 (shown in FIG. 1) such as one of the plurality of ladder rungs 72 (shown in FIG. 1). The upper anchor 120 can comprise a shock absorber 270, which can be configured to temporarily move when loaded by a force, such as the upper anchor 120 can experience when a user connected to the fall arrest system 80 begins to fall and thereby engage the system 80. As shown, internal components of the shock absorber 270 can be housed within a housing 272. In some aspects, as described below, the shock absorber 270 can be incorporated into a separate part of the fall arrest system 80 and can be left out of the upper anchor 120. The upper anchor 120 can comprise a cable link 280, which can define an opening 288*a* for securing the cable 140 (shown in FIG. 1) of the fall arrest system 80 and can define an opening 288*b*. The base 250 of the upper anchor 120 can define a first end 205 of the upper anchor 120, which can be configured to be secured to the elevated structure 50, and a second end 206 of the upper anchor 120 distal from the first end 205.

Figure 4:
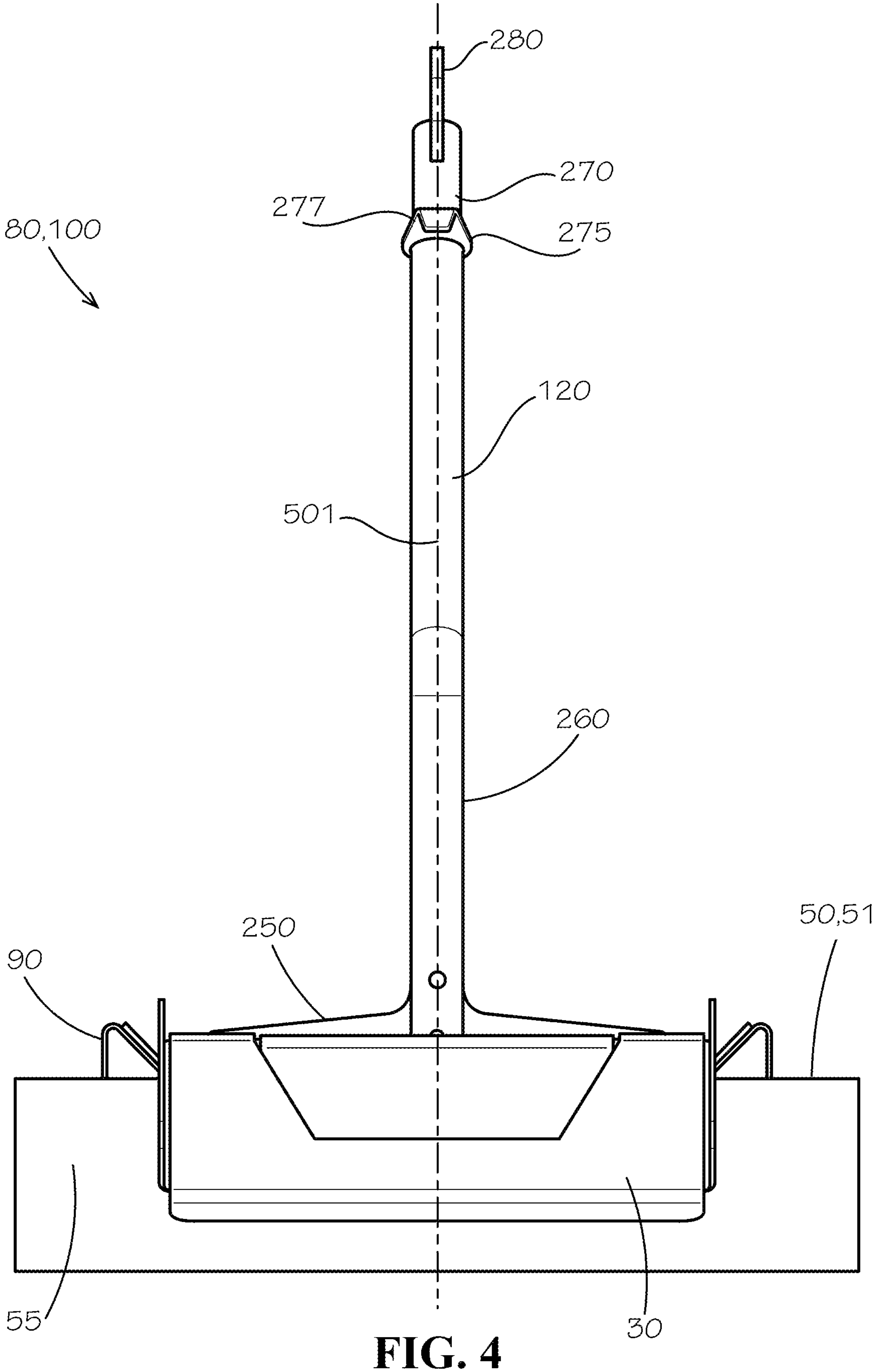
FIG. 4 is a front view of the upper anchor of FIG. 3 together with the ladder dock of FIG. 1 in accordance with another aspect of the current disclosure.

FIG. 4 is a front view of the upper anchor 120 of the fall arrest device 100 of the fall arrest system 80 together with the ladder dock 90 in accordance with another aspect of the current disclosure. As shown, the fall arrest device 100 and the ladder dock 90 and individual components thereof can be symmetrical about a centerline 501. As shown, the frame 260 can be angled with respect to the base 250 and, more specifically, the frame 260 can be orthogonal to (i.e., angled at 90 degrees with respect to) the base 250.

Figure 5:
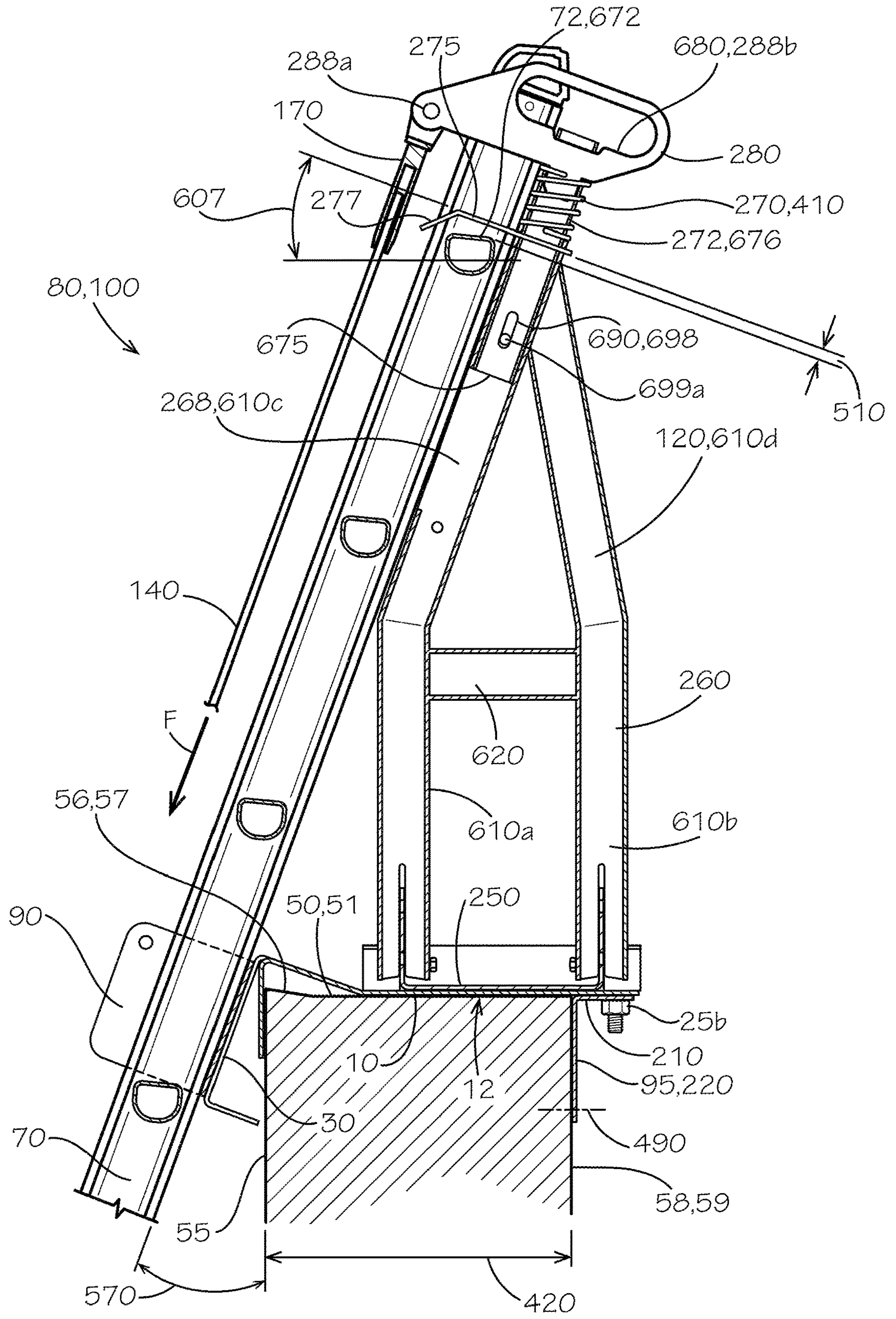
FIG. 5 is a side sectional view of the fall arrest system of FIG. 1 taken along line 5-5 of FIG. 2 in accordance with another aspect of the current disclosure comprising the upper anchor of FIG. 3 comprising an exposed shock absorber in accordance with another aspect of the current disclosure.

FIG. 5 is a side sectional view of the fall arrest device 100 of the fall arrest system 80 in accordance with another aspect of the current disclosure. As shown, the ladder dock 90 and, more specifically, a lower surface 12 of the mounting panel 10 can be mounted to the elevated structure 50. Again, also as shown, each of the ladder 70 and the upper anchor 120 can be mounted to the ladder dock 90. In contrast to the relationship between the ladder 70 and the upper anchor 120 shown in FIGS. 1 and 2, a gap 510 can be defined and is visible between the top ladder rung 72 and the engagement bracket 275 of the upper anchor 120. While some two-part (or multi-part) extension models of the ladder 70 allow for only rough adjustment of its length—by a distance typically equal to a distance between adjacent ladder rungs 72 in a longitudinal direction of the ladder 70—a length adjustment of the ladder 70 can be combined with a slight horizontal repositioning of a first end 75 (shown in FIG. 1) of the ladder 70 to achieve a proper fit between the nearest ladder rung 72 and the engagement bracket 275.

Per regulatory requirements such as those issued by the Occupational Safety & Health Administration (OSHA), a minimum ladder angle on a portable ladder such as the ladder 70 leaned up against the elevated structure 50 can be, when rounded to the nearest half degree, 14.5 degrees from the vertical or 75.5 degrees from the horizontal. This particular minimum ladder angle corresponds to a horizontal ladder "run" from the point of support on the elevated structure 50 to a point of ladder contact with the ground measuring one quarter of the vertical ladder "rise" between the same two points. Accordingly, the ladder dock 90 can define a ladder rest angle 570 measuring at least about 14.5 degrees or any other desired angle to provide a quick visual check of the ladder angle for any user of the ladder dock 90. As shown, the ladder rest angle 570 can be measured between a surface of the ladder rest panel 30 of the ladder dock 90 and the vertical orientation, with which the outer surface 55 of the elevated structure 50 is shown aligned.

Again, the upper anchor 120 can comprise the shock absorber 270. In some aspects, as shown, a portion of the shock absorber 270 such as, for example and without limitation, a shock absorbing element 410 can be exposed during normal operation of the upper anchor 120. In some aspects, as shown, the shock absorber 270 or a portion thereof can be oriented at an angle with respect to the vertical or can be aligned with a portion of the frame 260 or with a longitudinal direction 901 (shown in FIG. 9). In some aspects, the shock absorber 270 or a portion thereof can be oriented vertically or can be angled with respect to a portion of the frame 260. In some aspects, as shown, the shock absorbing element 410 can comprise a biasing element such as, for example and without limitation, a spring. In some aspects, the shock absorbing element 410 can comprise a gas cylinder. More specifically, the shock absorbing element 410 can comprise a compression spring. In some aspects, the shock absorbing element 410 can comprise a urethane compression spring, which can be a cylinder formed from urethane or another resilient material and can define, as desired, a bore therethrough for assembly with a mating rod of the shock absorber 270. In some aspect, the shock absorbing element 410 can comprise a cylinder enclosing a fluid. In any case, when a force F is applied to the cable 140 generally in the longitudinal direction 901 of the ladder 70 and the cable 140—such as when a weight of a user coupled to the cable 140 pulls downward on the cable 140 by a force equal to the force F—the force F can cause compression of the shock absorber 270 sufficient to effectively reduce deceleration of the user. The shock absorber 270 can thereby be configured to compress in the longitudinal direction 901, including when the force F acts in the longitudinal direction 901. Instead of more abruptly stopping moving of the user, reducing deceleration of the user such as through use of the shock absorber 270 can reduce stress on the user and on the cable 140 and on other components of the ladder dock 90 and the fall arrest device 100 of the fall arrest system 80. Reducing deceleration of the user can also facilitate compliance with regulatory requirements setting certain allowable ranges or levels of such a feature. As shown, a fastener 490 can secure the ladder dock 90—for example and without limitation, through a bracket such as an L-shaped bracket 95 shown or another portion of the ladder dock 90—to the elevated structure 50 to further help maintain the position of the fall arrest device 100 even under load. The bracket 95 itself can define a mounting flange or first flange 210 and a clamping flange or second flange 220. In some aspects, the bracket 95 can define mounting openings such as mounting openings 196 (shown in FIG. 20) for further securing the bracket 95 and the ladder dock 90 to a wall 58 of the elevated structure 50. The bracket 95 can be secured to a remaining portion of the ladder dock 90 by one or more fasteners 25*a,b* (25*a* shown in FIG. 7).

As also shown, portions of the shock absorber 270 can be pinned with a fastener 699*a* or otherwise fixed on a first end 675 to a stationary portion of the frame 260 and on a second end 676 to the movable housing 272. A pin and slot combination or other stop 690 can limit movement of the shock absorbing element 410 and thereby the shock absorber 270 and, ultimately, also the cable 140 through the cable link 280. For example and without limitation, as shown, a slot 698 defined in a first cylinder such as the housing 272 can receive the pin 699*a*, which can be fixed with respect to a second cylinder such as, for example and without limitation, a vertical member 610*c* of the frame 260. Movement of the housing 272, which can already be controlled by the shock absorbing element 410, can be limited by a position and a length of the slot 698 and by a diameter or width and a position of the pin 699*a*. As shown, a longitudinal direction or long dimension of the slot 698 can be aligned with a longitudinal direction of the frame 260 or, more specifically, the vertical member 610*c*.

As also shown, the cable link 280 or any other portion of the upper anchor 120 or, more generally, the fall arrest device 100 can define a handle opening 680, which in some aspects, as shown, can also be the opening 288*b*. A user can, for example, lift, transport, position, and otherwise manipulate the upper anchor 120 by gripping the cable link 280 at the handle opening 680. In other aspects, the handle opening 680 can be defined elsewhere on the upper anchor 120. As shown, a portion of the shock absorber 270 can be housed within a cavity 268 of the frame 260. The frame 260 can in part define separate members such as vertical members 610*a,b,c,d* and a horizontal member 620, which individually can define various geometric shapes in cross-section and together can define separate geometric shapes such as, for example and without limitation, a rectangular shape defined by the base 250, two of the vertical members 610*a,b*, and the horizontal member 620; and a triangular shape—or at least substantially triangular as shown—defined by the horizontal member 620 and the vertical members 610*c,d*.

In some aspects, the engagement bracket 275 or any portion thereof can be angled with respect to the horizontal orientation as shown by, for example and without limitation, an angle 607 with respect to the horizontal and can also be angled with respect to a neighboring portion of the frame 260. In other aspects, the engagement bracket 275 can be aligned with or parallel to the horizontal orientation (i.e., the angle 607 can be zero) to more closely match or to match exactly, depending on the precise orientation of the ladder 70, and an orientation of a top surface 672 of the ladder rungs 72.

The elevated structure 50 can define a raised edge 56. In some aspects, as shown, the raised edge 56, which can extend from the outer side surface 55 to the inner side surface 59, can comprise a parapet or wall 58 extending from the surface 51. For example and without limitation, the wall 58 can define a wall height 1710 (shown in FIG. 17) of at least 30 inches (762 millimeters) to 42 inches (1067 millimeters) and can measure as much as 48 inches (1219 millimeters) or more. The wall 58 can further define a wall width 420. The raised edge 56 can define a top surface 57 and, at least in the case of the wall 58, the outer side surface 55 and a second or inner side surface 59. In some aspects, the top surface 57 can be a horizontal surface. In some aspects, the top surface 57 or, as shown, any portion thereof can be sloped with respect to the horizontal.

Figure 6:
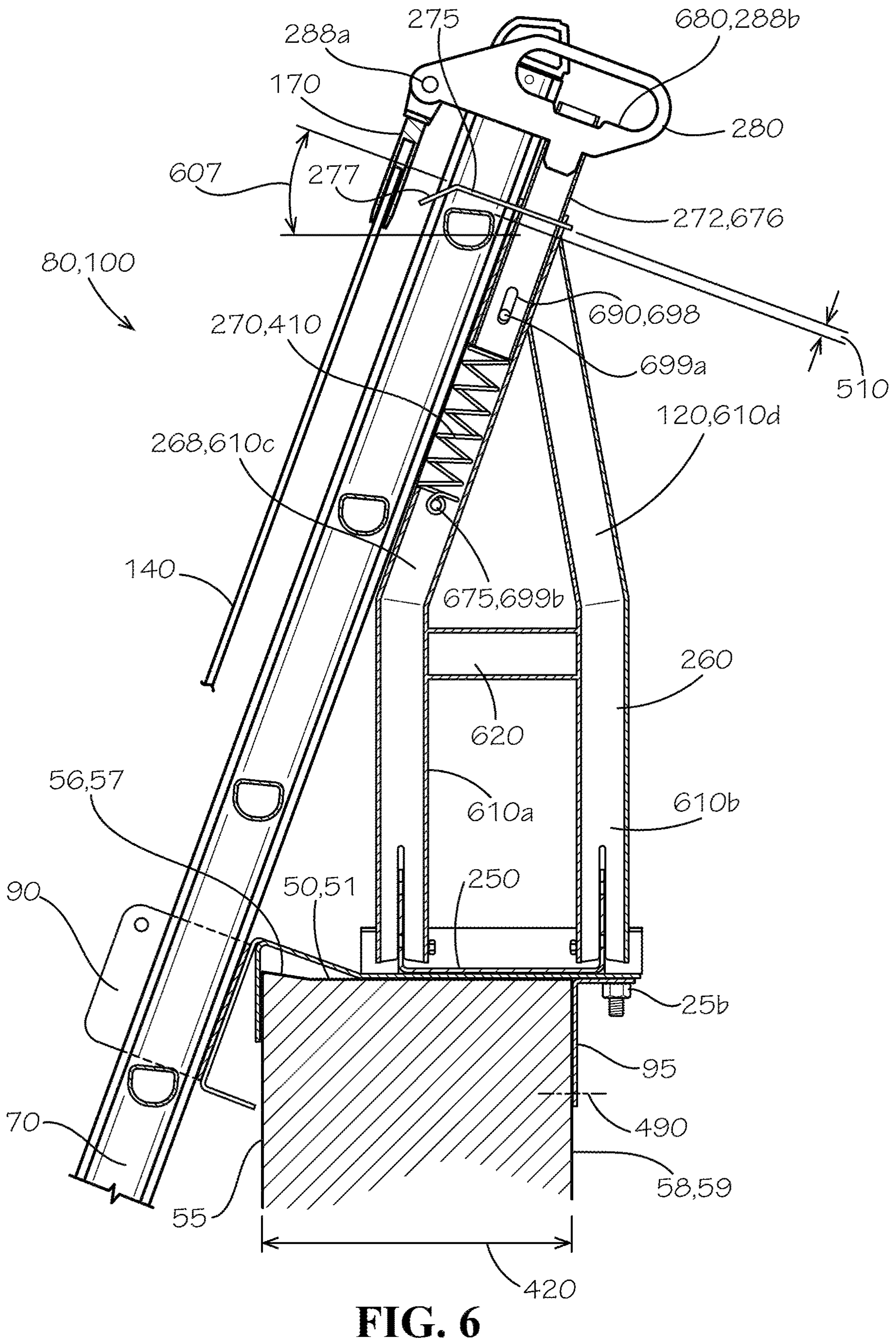
FIG. 6 is a side sectional view of the fall arrest system of FIG. 1 taken along line 5-5 of FIG. 2 in accordance with another aspect of the current disclosure comprising an upper anchor of FIG. 3 comprising a hidden shock absorber in accordance with another aspect of the current disclosure.

FIG. 6 is a side sectional view of the fall arrest device 100 of the fall arrest system 80 in accordance with yet another aspect of the current disclosure. As shown, portions of the shock absorber 270 including the shock absorbing element 410 can be hidden from view such as, for example and without limitation, inside the cavity 268 defined by the frame 260 and/or within the housing 272. Moreover, as shown, portions of the shock absorber 270 can be pinned or otherwise fixed on the first end 675 to a stationary portion of the frame 260 such as, for example and without limitation, a second pin 699*b*.

Figure 7:
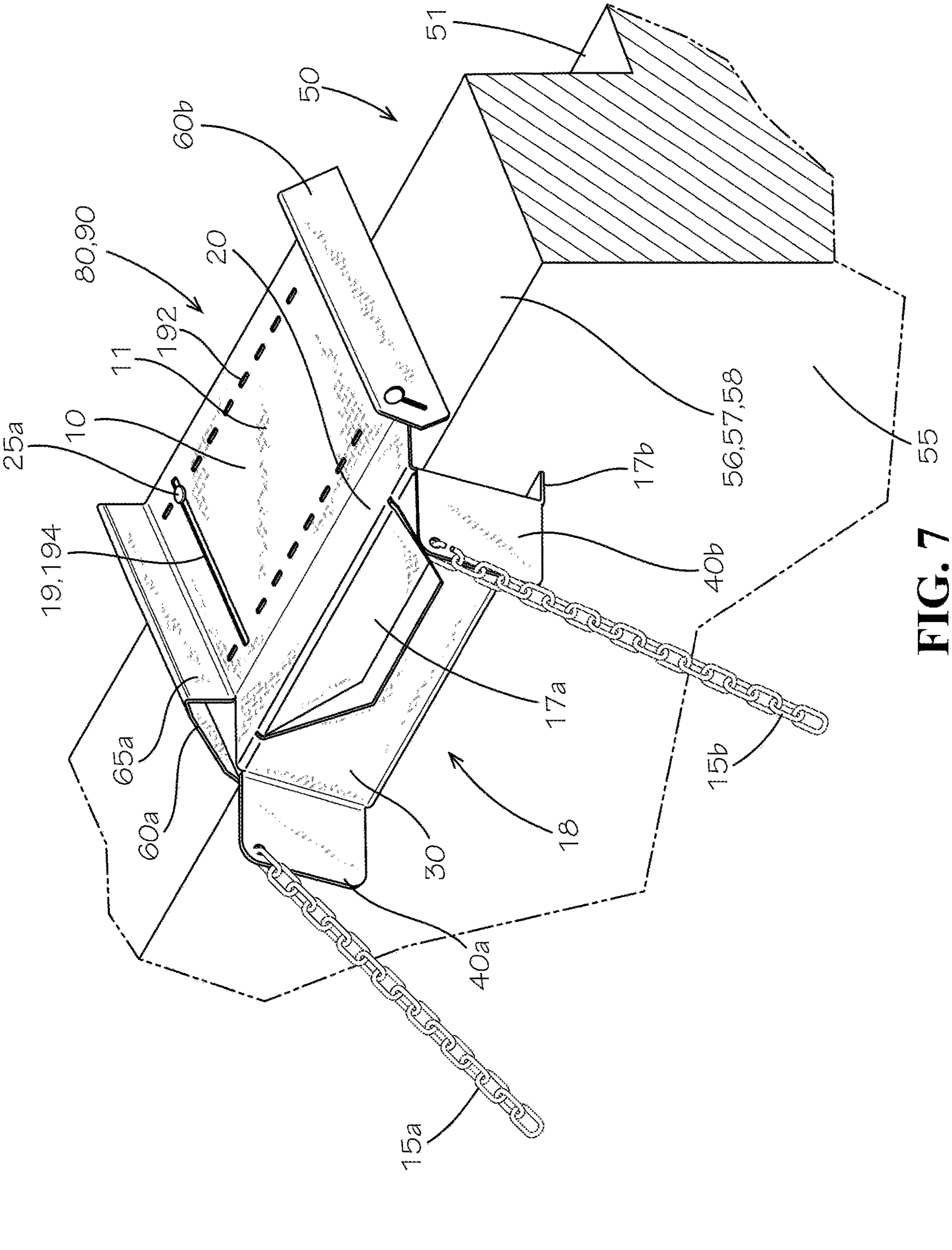
FIG. 7 is a front top perspective view of the ladder dock of FIG. 1 on a roof with a parapet in accordance with another aspect of the current disclosure.

FIG. 7 is a front top perspective view of a ladder dock 90 in an installed condition, position, or configuration in accordance with another aspect of the current disclosure. The elevated structure 50, which can be a roof of a structure such as a building, can define the surface 51, which can be a roof surface but can in other aspects be another surface. In some aspects, the surface 51 can be a horizontal surface. In some aspects, the surface 51 can be sloped with respect to the horizontal. As shown, the elevated structure 50 can comprise the wall 58.

Again, the ladder dock 90 can comprise the mounting panel 10, which can be positioned in facing contact with and mounted to the surface 51 and, in some aspects, the top surface 57 of the raised edge 56. The ladder dock 90 and, more specifically, the mounting panel 10 can define one or more openings to facilitate attachment of the ladder dock 90 to the elevated structure 50 using fasteners described below and, optionally where desired, the bracket 95 (shown in FIG. 5). As shown, the mounting panel 10 can define a planar or flat shape and can define an upper or outside surface 11 and the lower or inner surface 12 (shown in FIG. 5). All of the portions of the ladder dock 90 exemplarily shown in FIG. 7 can be formed monolithically, i.e., as a single piece, from a blank. As such, the ladder dock 90 can be formed from a single blank. The dimensions of various panels can be set to minimize material waste and maximize sheet utilization, especially where a sheet material such as sheet metal is used. For example and without limitation, the stop panel 17*a* can be formed from material that would otherwise be used for the ladder rest panel 30, and the material used to form the ears 40*a,b* can extend the same distance from the ladder rest panel 30 as the distance that the respective auxiliary panel 60*a,b* and connecting panel 65*a,b* extend from the mounting panel 10. Intersections of various edges of the blank can define chamfers or radii. Intersections of various edges that otherwise appear to intersect at 90-degree angles can define such angles.

The ladder dock 90 can comprise the ladder rest panel 30, which can be connected to the mounting panel 10. The ladder rest panel 30 can be angled with respect to the mounting panel 10. One or more of the ears 40*a,b* can extend from or be formed in the ladder rest panel 30 or otherwise formed from the ladder dock 90. The ears 40*a,b* can extend at an angle from the ladder rest panel 30. Together with the ladder rest panel 30, the ears 40*a,b* can define a ladder notch 18, by which the ladder dock 90 can be configured to prevent left-right or sideways movement of the ladder 70 (shown in FIG. 8) positioned against the ladder rest panel 30. In some aspects, the ladder dock 90 can define the ladder notch 18 without the ladder rest panel 30 or without even the ears 40*a,b*.

The fall arrest system 80 comprising the ladder dock 90 can further comprise the retaining fasteners 15*a,b*, which can be secured to and extend from the ladder dock 90. More specifically, the retaining fasteners 15*a,b* can be secured to and extend from any of the mounting panel 10, the connecting panel 20, the ladder rest panel 30, or the ears 40*a,b*.

In some aspects, the ladder rest panel 30 can be connected directly to and extend from the mounting panel 10. In other aspects, the ladder rest panel 30 can be connected to and extend from the mounting panel 10 through the connecting panel 20, which as described below can provide relief for the raised edge 56. In some aspects, further panels such as the auxiliary panels 60*a,b* can be connected directly to and extend directly from the mounting panel 10. In other aspects, the auxiliary panels 60*a,b* can be connected to and extend from the mounting panel 10 through the connecting panels 65*a,b* (65*b* shown in FIG. 3).

Stop panels 17*a,b* can extend from any of the aforementioned panels to help, for example, maintain a proper orientation of the ladder dock 90 with respect to the elevated structure 50. In some aspects, as shown, the stop panel 17*a* can extend from the connecting panel 20 or from the ladder rest panel 30—depending on the precise point or location of bending of the stop panel 17*a*—and the stop panel 17*b* can extend from the ladder rest panel 30.

The ladder dock 90 can be secured directly to the elevated structure 50 using fasteners (not shown) extending through openings 19 defined in the mounting panel 10 and into the elevated structure 50. More specifically, the ladder dock 90 and the mounting panel 10 can define surface mounting opening 192 and bracket mounting openings 194. In some aspects, a single opening 19 or one each of the mounting openings 192, 194 can suffice. In other aspects, the ladder dock 90 and the mounting panel 10 can define a plurality of either the surface mounting openings 192 or the bracket mounting openings 194 or a plurality of each of the mounting openings 192, 194. Defining the plurality of the surface mounting openings 192 in the ladder dock 90 and orienting a lengthwise dimension of the surface mounting openings 192 as shown can increase significantly the possibility that any front-and-rear set of surface mounting openings 192 will align with a structural member (not shown) positioned behind or under the surface 51 of the elevated structure 50 and generally not adjustable at all.

Fasteners 25*a,b* (25*b* shown in FIG. 5) can extend through bracket mounting openings 194 as shown and can be used to secure the bracket 95 to the mounting panel 10. For example and without limitation, a position of the bracket 95—and thereby a distance between the bracket 95 and the stop panel 17*a* can be positioned to match the wall width 420 (shown in FIG. 5) of the wall 58.

Figure 8:
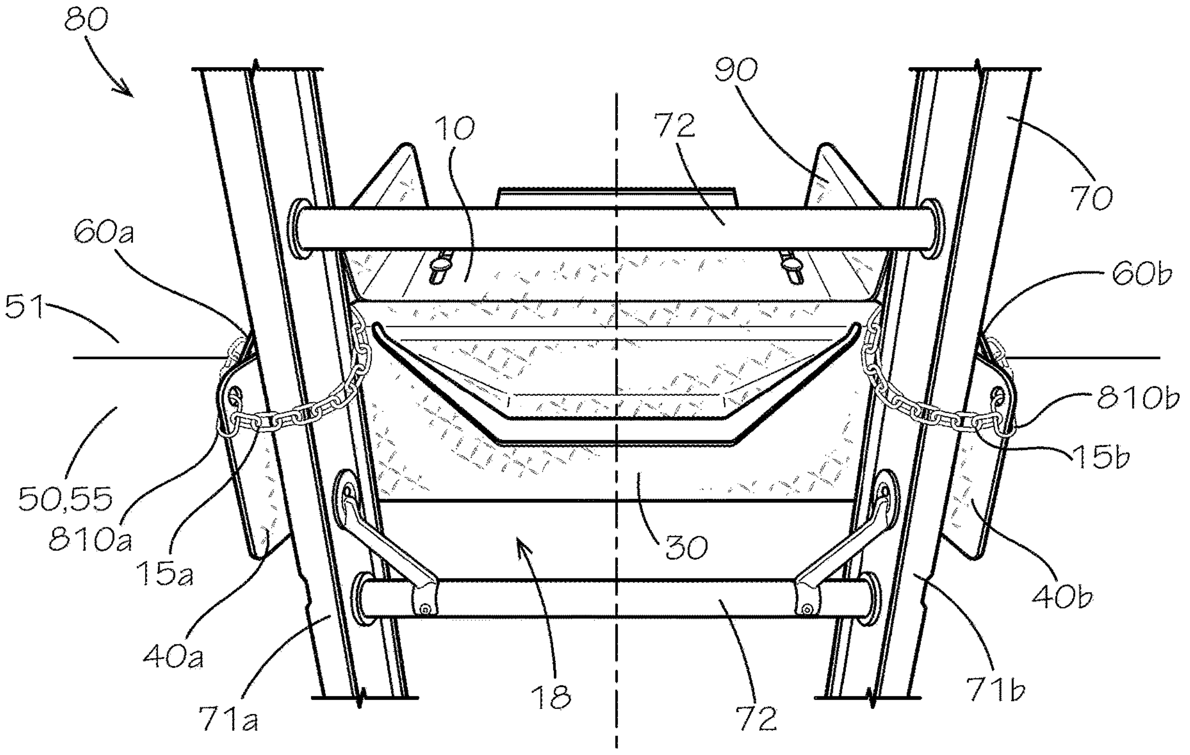
FIG. 8 is a front perspective view of a fall arrest system of FIG. 1 comprising the ladder of FIG. 1 leaning against the ladder dock of FIG. 7 and comprising two chains for securing the ladder to the ladder dock.

FIG. 8 is a front perspective view of the fall arrest system 80 comprising the ladder 70 leaning against the ladder rest panel 30 of the ladder dock 90 and comprising the retaining fasteners 15*a,b* for securing the ladder 70 to the ladder dock 90. As described above, the ladder 70 can comprise the first rail 71*a*, the second rail 71*b* offset from the first rail 71*a*, and the ladder rungs 72 extending from the first rail 71*a* to the second rail 71*b*. The system 80 can further comprise the retaining fasteners 15*a,b* for securing the ladder 70 to the ladder dock 90. More specifically, the retaining fasteners 15*a,b* can extend from a first portion of the ladder dock 90 such as, for example and without limitation, the respective ears 40*a,b*; around the respective rails 71*a,b*; and to a second portion of the ladder dock 90 such as, for example and without limitation, the respective auxiliary panels 60*a,b*.

In some aspects, as shown, the retaining fasteners 15*a,b* can be secured to the ladder dock 90 and, more specifically, to each of the ears 40*a,b* and similarly to the auxiliary panels 60*a,b* with a connecting fastener 810*a,b*. In other aspects, as shown, the retaining fasteners 15*a,b* can be secured directly to the ladder dock 90 and, more specifically, directly to the auxiliary panels 60*a,b* and similarly to each of the ears 40*a,b* with the retaining fastener 15*a,b* itself. For example and without limitation, each of the retaining fasteners 15*a,b* can be a flexible fastener such as a chain or a rope. A portion of chain links of the retaining fastener 15*a,b* can extend through the larger portion 682 (shown in FIG. 3) of the corresponding retaining opening 68 (shown in FIG. 3) and can then be slid and locked into a smaller portion 684 (shown in FIG. 3). In other aspects, a rope such as a wire rope, optionally with spaced ferrules or terminating with the connecting fasteners 810*a,b*, can secure the ladder 70 to the ladder dock 90. To facilitate retention of the ladder 70 in the ladder notch 18 of the ladder dock 90, the ears 40*a,b* can extend in a direction of extension of the ears 40*a,b* at least as far as or beyond a width of the rails 71*a,b* in the direction of extension.

Figure 9:
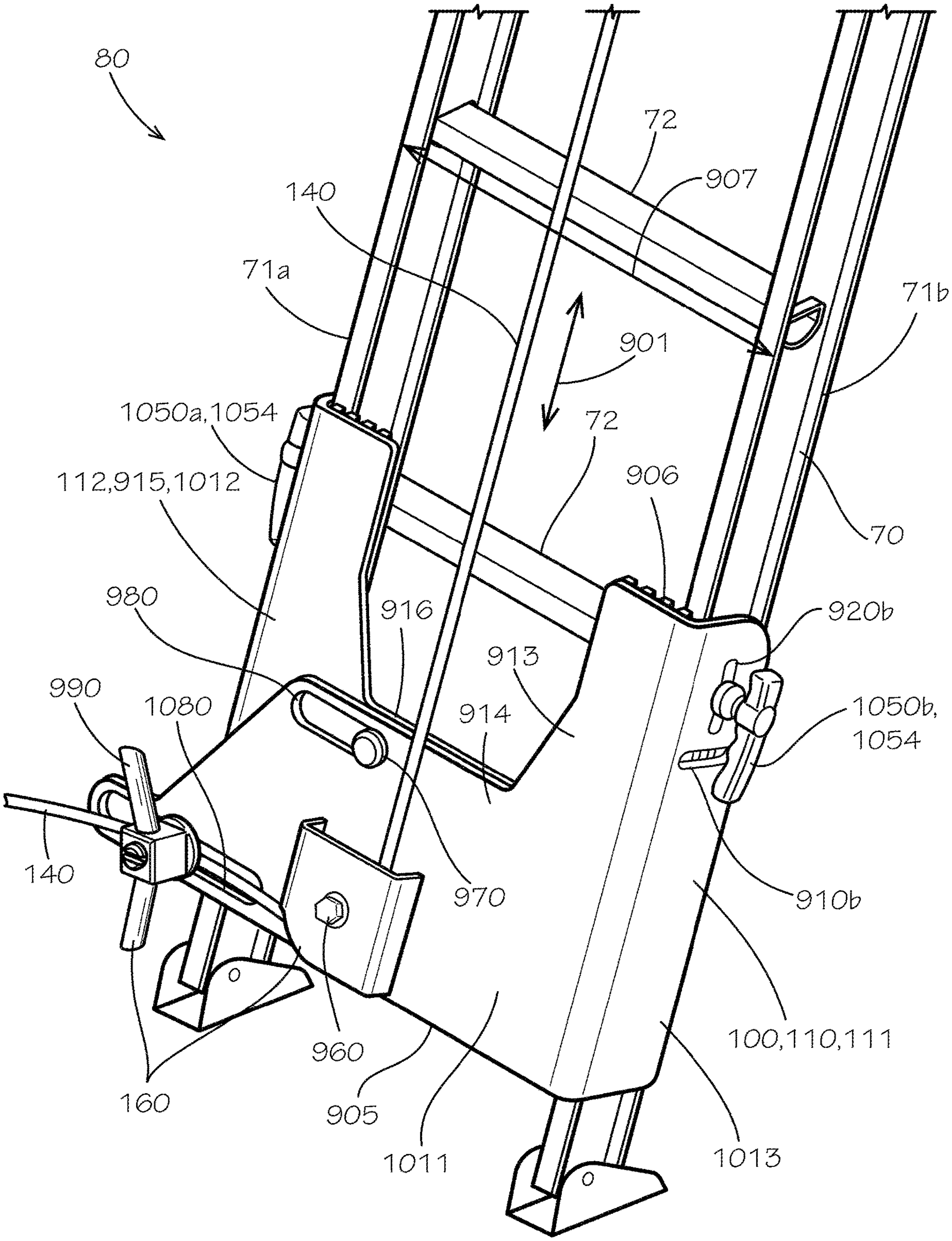
FIG. 9 is a front perspective view of the fall arrest system of FIG. 1 illustrating Detail 9 of FIG. 1 and showing a lower anchor.

FIG. 9 shows a front perspective view of the fall arrest system 80 showing the lower anchor 110 in one aspect of the current disclosure. In some aspects, the lower anchor 110 can comprise a first portion 111, and the lower anchor 110 can further comprise a second portion 112 assembled to the first portion 111. The second portion 112 can be assembled and slideably secured to the first portion 111 with a fastener such as the fastener 970. The ladder 70 can define a ladder width 907 and can be received tightly within the lower anchor 110 and, more specifically, between the first portion 111 and the second portion 112, In some aspects, when the ladder width 907 matches a lower anchor width 1007 (shown in FIG. 10), which can be measured from an inside surface of side flanges 1013, 1015 of the respective portions 111, 112 of the lower anchor 110, the side flanges 1013, 1015 can contact the rails 71*a,b* of the ladder 70. In some aspects, when the ladder width 907 substantially matches the lower anchor width 1007, the side flanges 1013, 1015 (shown in FIG. 11) of the respective portions 111, 112 of the lower anchor 110 can prevent rotation of the lower anchor 110 with respect to the ladder 70. In other aspects, neither the first portion 111 nor the second portion 112 is required, and the cable 140 can be secured to one of the ladder rungs 72 of the ladder 70 directly or through a fastener (not shown) or through the cable attachment 160.

Pins 1050*a,b*, each of which can comprise one or more of a shaft 1052 (shown in FIG. 13), a handle 1054, an attachment pin (not shown) for securing the shaft 1052 to the handle 1054, a detent 1356 (shown in FIG. 13), and a washer 1358 (shown in FIG. 13), can be used to secure the lower anchor 110 against the respective rails 71*a,b* of the ladder 70. More specifically, the pins 1050*a,b* can extend through portions of the lower anchor 110 such as, respectively, the first portion 111 and the second portion 112 and into the nearest ladder rung 72. For example and without limitation, each of the pins 1050*a,b* can comprise a quick-release pin, which can be configured to secure the lower anchor 110 to the ladder 70. By fixing or securing the lower anchor 110 to the ladder 70, the lower anchor 110 can be configured to not rotate with respect to the ladder 70. Further, by fixing or securing the lower anchor 110 to the ladder 70, movement of the lower anchor 110 with respect to the ladder 70 in the longitudinal direction 901 of the ladder 70 can be prevented. The handle 1054 of each of the pins 1050*a,b* can comprise define a "T" shape to facilitate a manual grip by even a gloved hand. Each of the pins 1050*a,b* can comprise a magnetic surface to cause the pins 1050*a,b* to be held in position against neighboring portions of the lower anchor 110 such as respective surfaces of the first portion 111 and the second portion 112. As shown, the cable 140 can pass around a pulley 1340 (shown in FIG. 13) of the cable attachment 160 and through a locking fastener 990 of the cable attachment 160. The pulley 1340 can rotate about and be fixed in position by a fastener 960. In some aspects, the lower anchor 110 can secure a lower end of the cable 140. In some aspects, the lower anchor 110 can be a lower "weight plate" and can help maintain the cable 140 in tension by a weight and position adjustment of the lower anchor 110. For example and without limitation, the lower anchor 110 can define a weight of 25 pounds or more and can by its own weight facilitate user efforts to set and maintain a tension on the cable 140.

Slots 910*a,b* and 920*a,b* (910*a* and 920*a* shown in FIG. 11), which can be defined in the first portion 111 and the second portion 112, can facilitate the position adjustment of the lower anchor 110. As shown, each of the slots 920*a,b* can be oriented in the longitudinal direction 901 of the lower anchor 110 and the ladder 70, and each of the slots 910*a,b* can be oriented at an angle, which can be 90 degrees, to the longitudinal direction of the lower anchor 110 and the ladder 70. As shown, the slots 910*a,b* can be positioned closer to a first end 905 of the lower anchor 110 than the slots 920*a,b*; and the slots 920*a,b* can be positioned closer to a second end 906 of the lower anchor 110 than the slots 910*a,b*. In some aspects, the slots 910*a,b* can be used for initial positioning of the lower anchor 110 and tensioning of the cable 140; and the slots 920*a,b* can be used for further positioning of the lower anchor 110 and tensioning of the cable 140.

The fastener 970 can slideably secure the first portion 111 to the second portion 112 but allow for adjustment for when the ladder 70 may be wider or narrower than the assembled condition of the lower anchor 110. A slot 980 defined in one of the first portion 111 and the second portion 112 can receive the fastener 970 and allow for such adjustment. The fastener 970 itself can comprise, for example and without limitation, a bolt and a nut. As shown, the first portion 111 and the second portion 112 of the lower anchor 110 can respectively define vertical or upright legs 913, 915, which can extend in a direction parallel to the longitudinal direction 901, and horizontal legs 914, 916, which can extend in a direction angled with respect to the longitudinal direction 901. In some aspects, the upright legs 913, 915 can assemble to the rails 71*a,b* of the ladder 70, and the horizontal legs 914, 916 can assemble to each other. As shown, the upright legs 913, 915 can define the side flanges 1013, 1015 (1015 shown in FIG. 11), each of which can be angled with respect to a front surface 1011, 1012 of the respective first portion 111 and the second portion 112. In some aspects, as shown, each of the first portion 111 and the second portion 112 can define an L-shape when viewing each along the longitudinal direction 901. A slot 1080, which can be defined in the first portion 111, can slidably receive the locking fastener 990.

Figure 10:
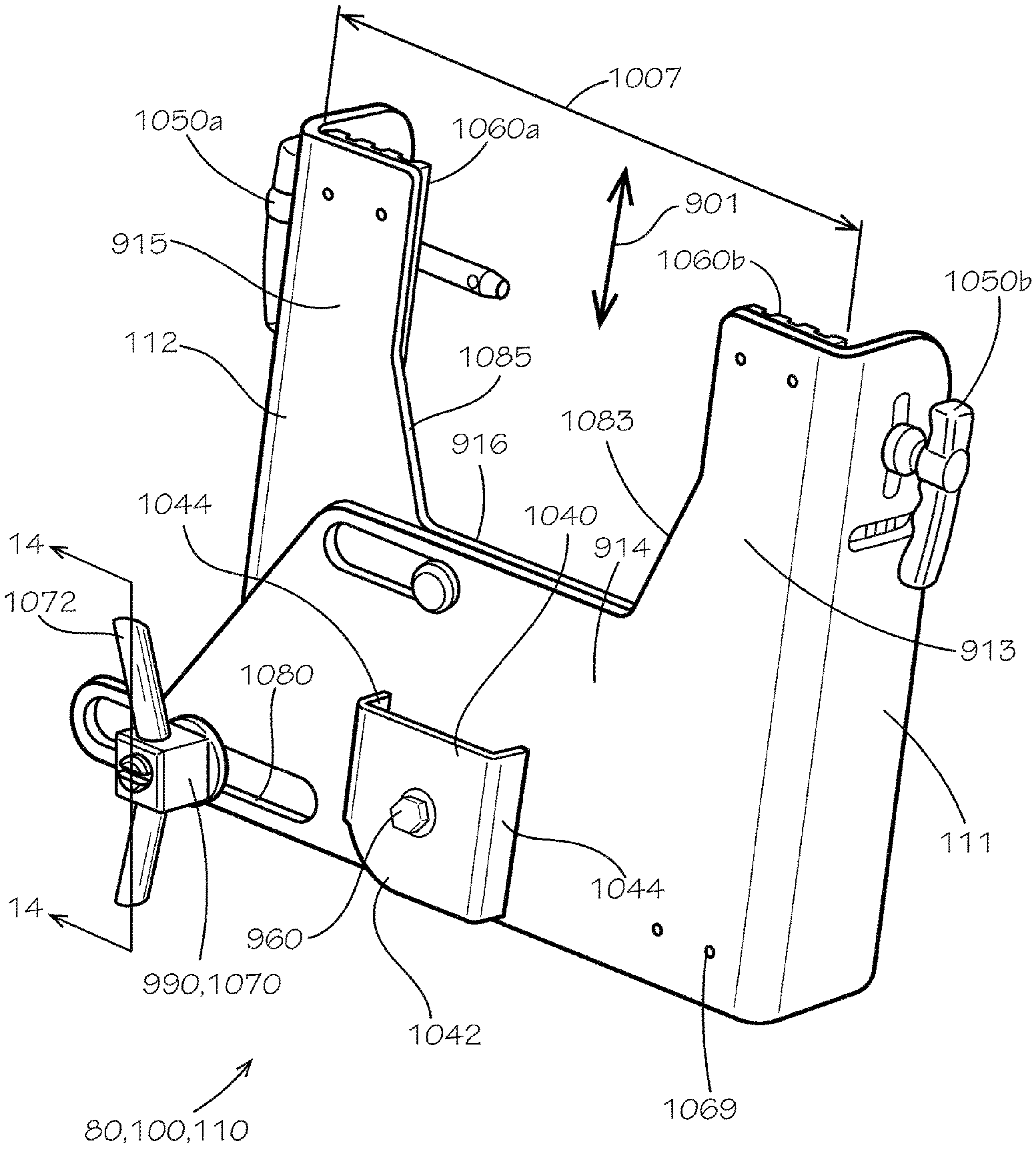
FIG. 10 is a front perspective view of the lower anchor of FIG. 9 of the fall arrest system of FIG. 1.
Figure 11:
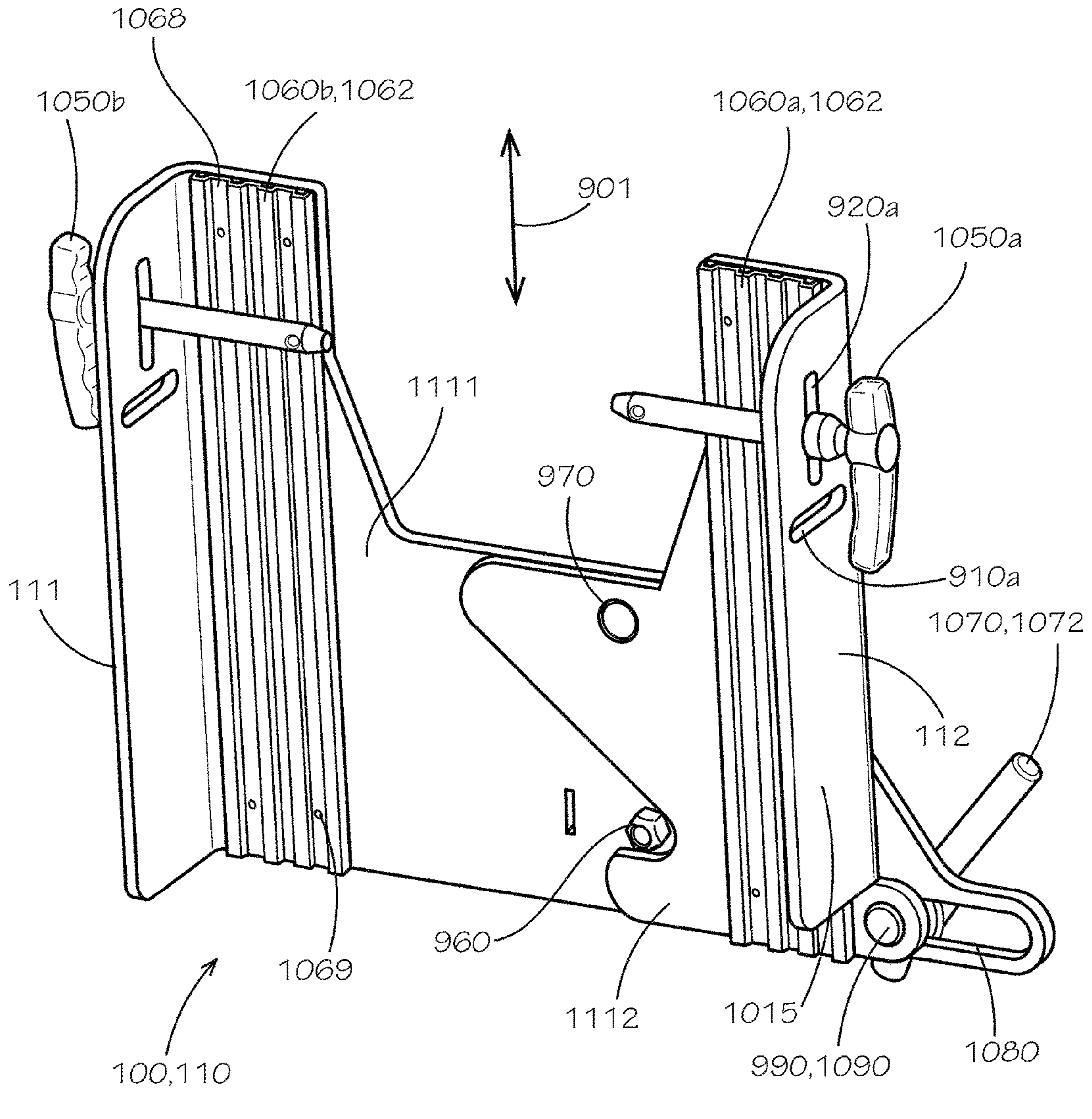
FIG. 11 is a rear perspective view of the lower anchor of FIG. 9 of the fall arrest system of FIG. 1.

FIG. 10 is a front perspective view and FIG. 11 is a rear perspective view of the lower anchor 110 of the fall arrest device 100 of the fall arrest system 80 (shown in FIG. 9). Referring to FIG. 10, a guard 1040 can cover the pulley 1340 (shown in FIG. 13). The guard 1040 can comprise a panel 1042 and one or more flanges 1044. As shown, respective intersections between the upright legs 913, 915 and the horizontal legs 914, 916 can define internal material webs 1083, 1085, which can be a chamfer or radius and can, for example, reduce a stress concentration at the corresponding intersection when the lower anchor 110 is loaded, such as by tensioning of the cable 140 (shown in FIG. 1). Edges of the lower anchor 110 can be opened, notched, or angled with respect to an adjacent edge or the longitudinal direction 901. Shims 1060*a,b* can further be secured to the respective portions 111, 112 with fasteners 1069.

As shown, the locking fastener 990 can be configured to be tightened without a tool and by simply the hand of a user. More specifically, the locking fastener 990 can comprise a nut 1070 such as, for example and without limitation, a wing nut as shown. For example, such a wing nut can be a coil wing nut such as a CWN series product available from OCM, Inc., of Graysville, Illinois, U.S.A. The nut 1070 can comprise arms 1072 and coil threads. The locking fastener 990 can comprise a threaded stud 1090 (shown in FIG. 11), which can be secured to one of the first portion 111 or, as shown, the second portion 112, with a threaded connection comprising threads such as coil threads and can be further secured with a weldment or thread lock material. As shown, the locking fastener 990 can slideably secure the cable 140 to either or both of the first portion 111 and the second portion 112 but allow for adjustment for when the ladder 70 (shown in FIG. 1) may be wider or narrower than the assembled condition of the lower anchor 110. The slot 1080 can receive the locking fastener 990 and allow for such adjustment. The threads of the nut 1070 and the threaded stud 1090 can be, for example and without limitation, the aforementioned coil threads or an Acme thread or any thread and can be configured for repeated loosening and tightening in dirty or wet conditions.

As shown in FIG. 11, on respective rear surfaces 1111, 1112 of the portions 111, 112 of the lower anchor 110, the respective shims 1060*a,b* can be positioned for one or more reasons such as, for example and without limitation, to adjust a coefficient of friction between the ladder 70 (shown in FIG. 1) and surfaces of the lower anchor 110 or to provide a wear surface (instead of, for example, a thin layer of paint or powder coating on the surfaces of the lower anchor 110). As shown, the shims 1060*a,b* can define one or more grooves 1068, an inner surface 1061 (shown in FIG. 13), and an outer surface 1062.

Figure 12:
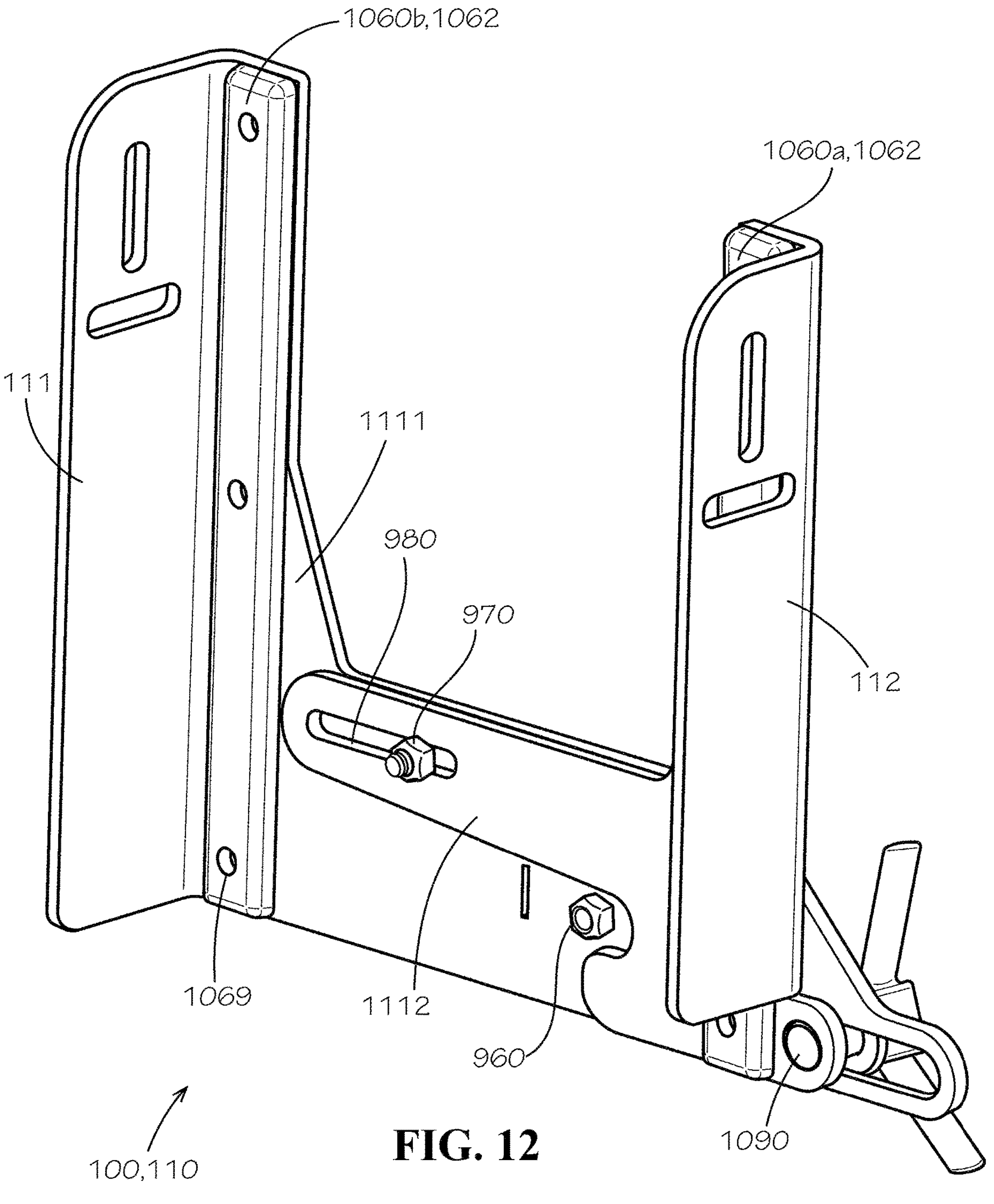
FIG. 12 is a rear perspective view of the lower anchor of FIG. 9 of the fall arrest system of FIG. 1 in accordance with another aspect of the current disclosure.

FIG. 12 is a rear perspective view of the lower anchor 110 of the fall arrest system 80 (shown in FIG. 9) in accordance with another aspect of the current disclosure. As shown, the shims 1060*a,b* can define a flat surface on each of the inner surface 1061 (shown in FIG. 13) and the outer surface 1062.

Figure 13:
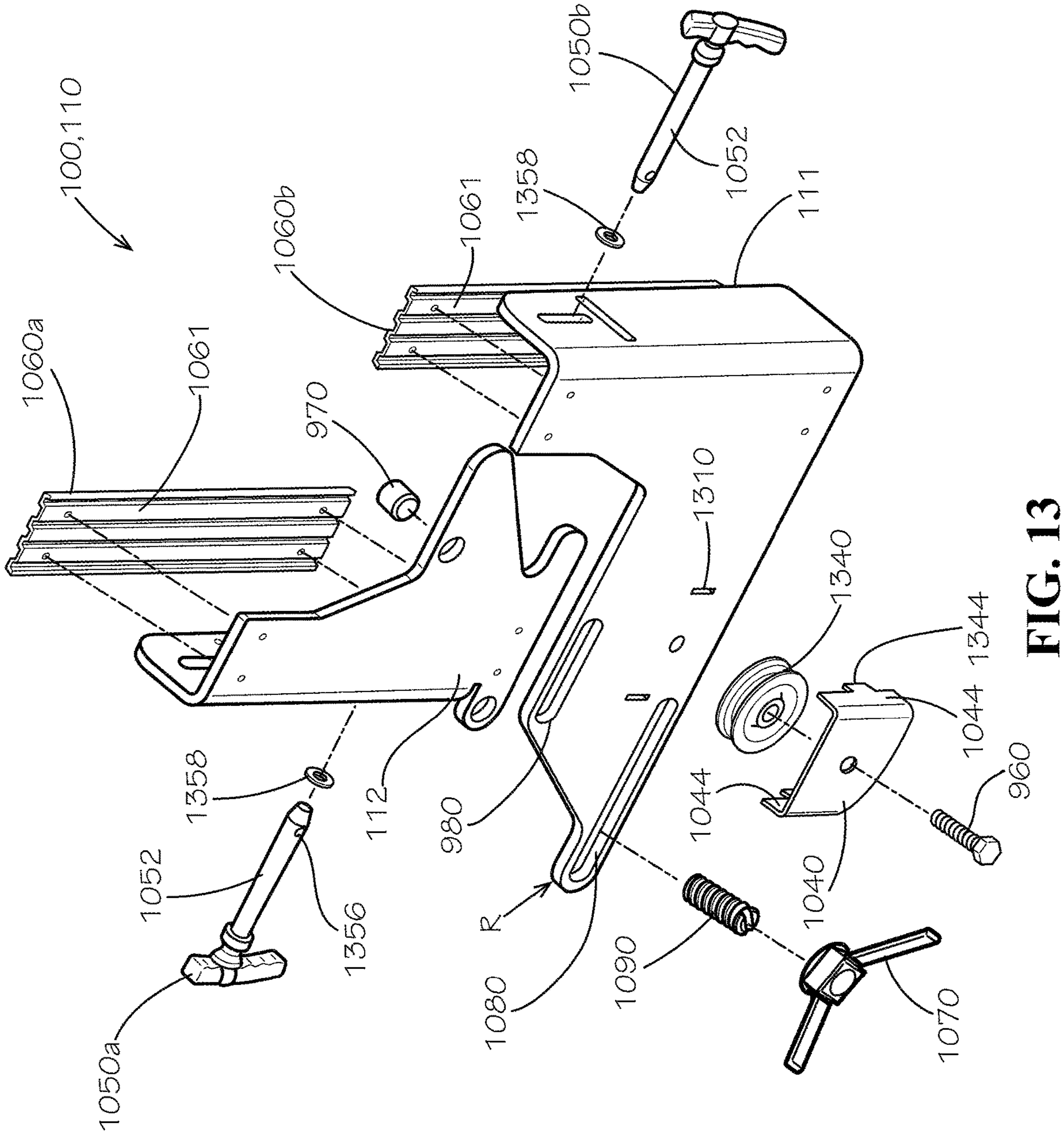
FIG. 13 is a front exploded perspective view of the lower anchor of FIG. 9 of the fall arrest system of FIG. 1.

FIG. 13 is a front exploded perspective view of the lower anchor 110 of the fall arrest device 100 of the fall arrest system 80 (shown in FIG. 9). As shown, the flanges 1044 can define tabs 1344 and can be received within openings 1310 defined in one of the second portion 112 or, as shown, the first portion 111. Various bores can be defined in the first portion 111 or the second portion 112 and can be sized and configured to receive fasteners such as the aforementioned fasteners 960, 970 or the stud 1090. Instead of discrete fasteners, the shims 1060*a,b* can be secured with an adhesive material applied to the shims 1060*a,b*, the portions 111, 112, or both the shims 1060*a,b* and the portions 111, 112.

As shown, intersections of any one of various edges of the components of the fall arrest system 80 can define a radius R or a chamfer. Intersections of various edges that otherwise appear to intersect at 90-degree angles can define such angles. Various panels can define chamfers or external or internal radii to facilitate safety, to ease insertion of the ladder 70 (shown in FIG. 1) into the ladder dock 90 (shown in FIG. 1) or the fall arrest device 100 onto the ladder 70, and/or to reduce stress concentrations in, reinforce a portion of, or reduce weight of the components of the fall arrest system 80. Various components of the fall arrest system 80, including any of the aforementioned portions 111, 112, can define openings such as notches for clearance of the one with respect to the other or for another reason such as, for example and without limitation, weight savings.

Figure 14:
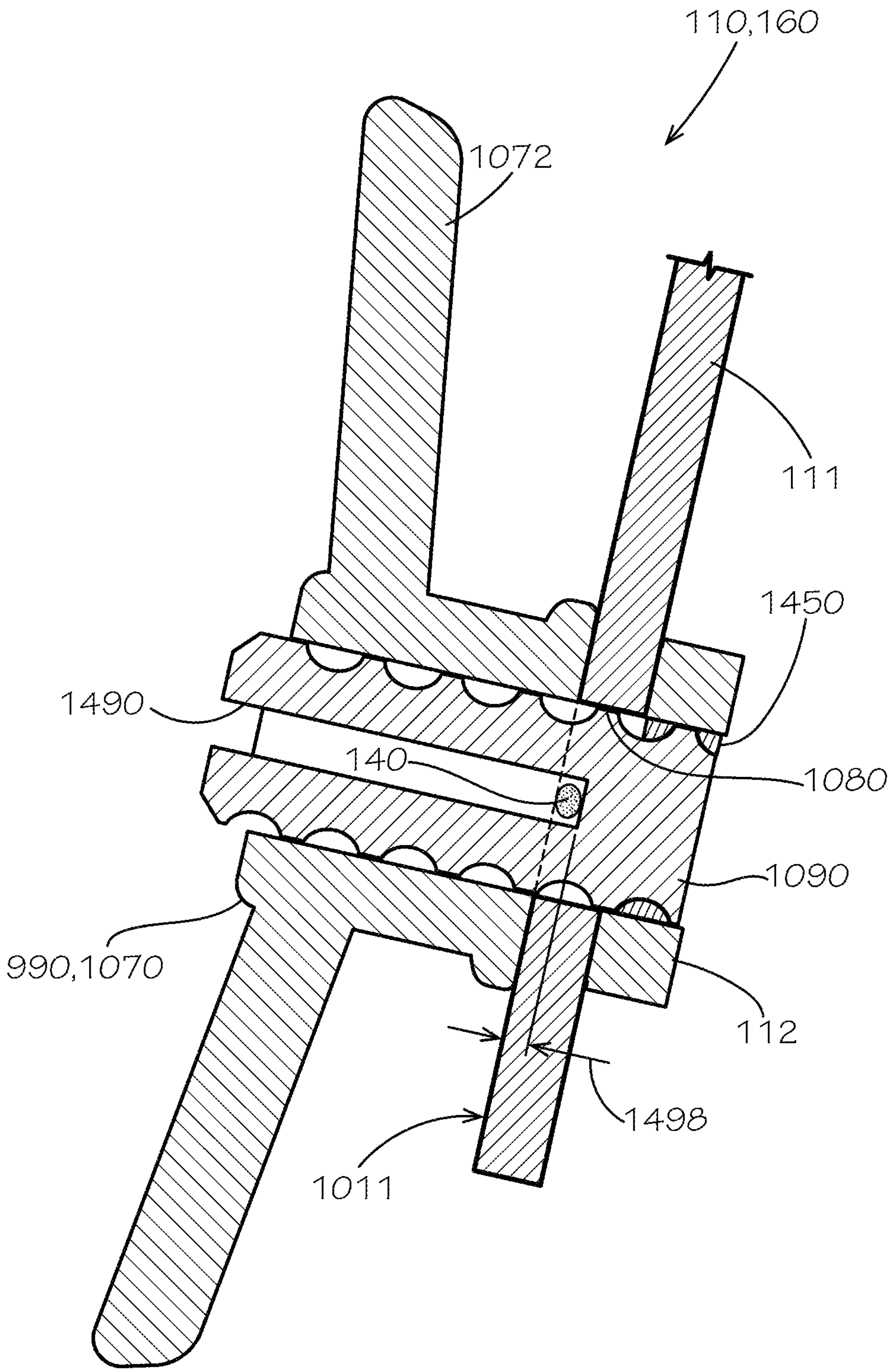
FIG. 14 is a sectional view of a cable attachment of the lower anchor of FIG. 9 taken along line 14-14 of FIG. 10.

FIG. 14 is a sectional view of a cable attachment 160 of the lower anchor 110 taken along line 14-14 of FIG. 10 including, more specifically, the locking fastener 990, which again can comprise the nut 1070 and the stud 1090. As shown, the stud 1090 can define a slot 1490, which can be sized to receive and retain the cable 140. As shown, a distance 1498 between a bottom of the slot 1490 and the front surface 1011 of the first portion 111 can be less than a diameter or thickness of the cable 140 when fully compressed, which can facilitate full compression of the cable 140 by the locking fastener 990. The locking fastener 990 can thereby be configured to receive and fix a position of the cable 140 relative to the lower anchor 110.

Figure 15:
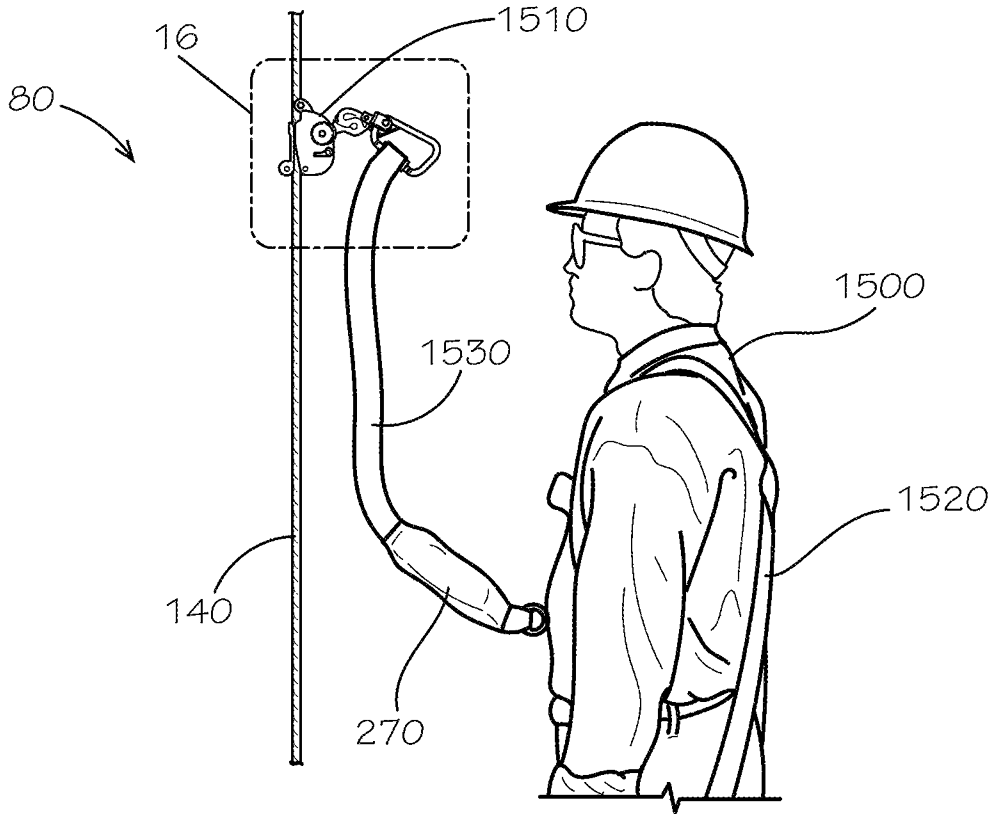
FIG. 15 is a side view of a user of the fall arrest system of FIG. 1 showing the user coupled to a cable of the fall arrest system with a detachable cable sleeve.

FIG. 15 is a side view of a user 1500 of the fall arrest system 80 showing the user coupled to the cable 140 of the fall arrest system 80 with a cam-locking cable traveler or cable sleeve 1510, which can be selectively received by and detachable from the cable 140 without tools. The user can wear a safety harness 1520 and secure the safety harness 1520 to the cable sleeve 1510. A connecting harness 1530 can connect the safety harness 1520 to the cable sleeve 1510. The cable 140 can be configured to allow movement of the cable sleeve 1510 to any position between the upper anchor 120 and the lower anchor 110.

Figure 16:
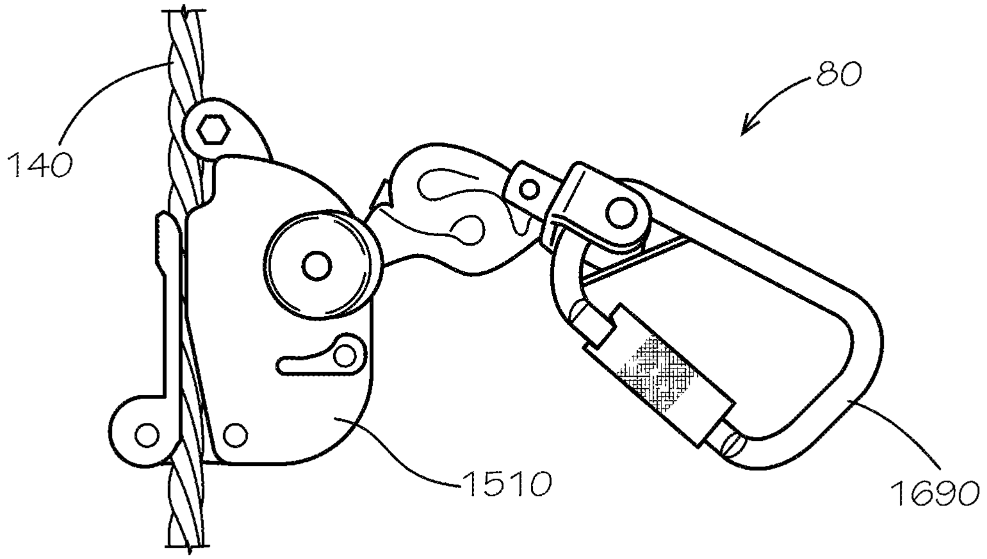
FIG. 16 is a side view of the cable sleeve of FIG. 15 taken from detail 16 of FIG. 15 in accordance with another aspect of the current disclosure.

FIG. 16 is a side view of the cable sleeve 1510 in accordance with another aspect of the current disclosure. As shown, the cable sleeve 1510 can comprise a connector 1690 such as, for example and without limitation, a carabiner. The connector 1690 can be configured to selectively engage and release the user from the cable sleeve 1510.

Figure 17:
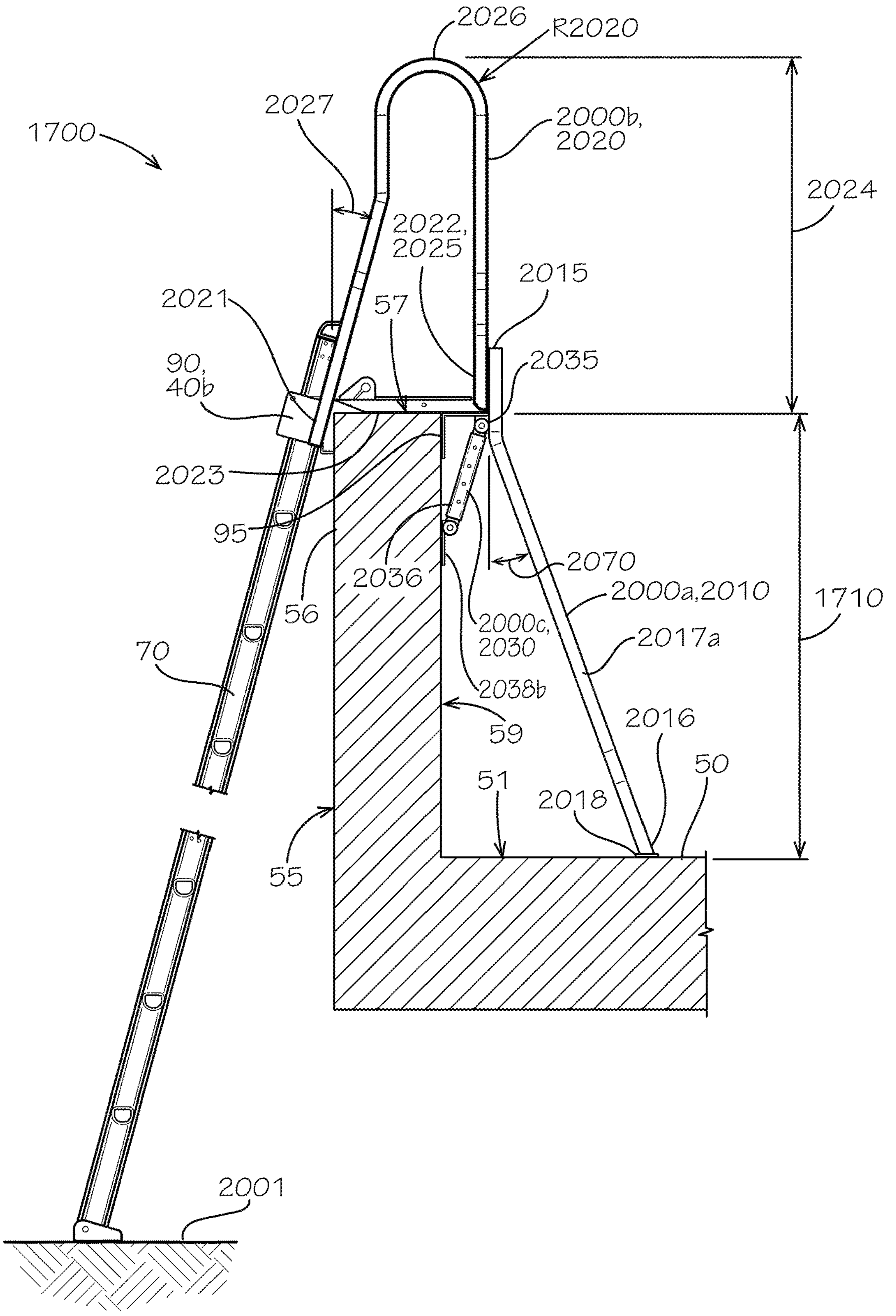
FIG. 17 is a side view of a ladder dock system comprising the ladder dock of FIG. 1 in accordance with another aspect of the current disclosure and further comprising a parapet descent apparatus in an installed condition on a roof with a parapet.

FIGS. 17-20 show a ladder dock system 1700 comprising the ladder 70, the ladder dock 90, the fall arrest system 1000, and/or four parapet descent apparatuses 2000*a,b,c,d* in an installed condition on an elevated structure 50 with a raised edge 56 shown as a parapet in accordance with various aspects of the current disclosure. FIG. 17 is a side view of the ladder dock system 1700 comprising the ladder 70, the ladder dock 90, and the parapet descent apparatuses 2000*a, b,c* in an installed condition. As shown, each of the parapet descent apparatuses 2000*a,b,c* can be secured to the ladder dock 90 to facilitate a user's descent from a top surface 57 of the raised edge 56 down to the surface 51 of the elevated structure or down the ladder 70 to the lower surface 2001.

The parapet descent apparatus 2000*a* can comprise a parapet ladder 2010 extending from the top surface 57 of the parapet or raised edge 56 or from a position proximate to the top surface 57 of the parapet or raised edge 56 to the surface 51 of the elevated structure 50. The parapet ladder 2010 can define a first end 2015 proximate to the ladder dock 90 and a second end 2016 proximate to the surface 51. In some aspects, a portion of the parapet ladder 2010 between the first end 2015 and the second end 2016 can be angled with respect to the vertical by an angle 2070 to facilitate descent by a user. In some aspects, a portion of the parapet ladder 2010 between the first end 2015 and the second end 2016 can be oriented vertically. Feet 2018, which can be adjustable, can be attached to and can stabilize ladder rails 2017*a,b* (2017*b* shown in FIG. 18) and a base of the parapet ladder 2010 and the parapet ladder 2010 generally. Again, the raised edge 56, e.g., a parapet, of the elevated structure 50 can define the wall height 1710.

The parapet descent apparatus 2000*b* can comprise a guide rail 2020 extending vertically upward from the ladder dock 90. As shown, the guide rail 2020 can define a first end 2025 proximate to the ladder dock 90 and a second end 2026 distal from the ladder dock 90. The guide rail 2020 can define a rail height 2024 measured from the top surface 57, which can be set to satisfy applicable ergonomic and/or safety requirements. As shown, the first end 2025 of the guide rail 2020 can comprise two ends 2021, 2022, either or both of which can be secured to the ladder dock 90. As shown, the end 2021 can be secured to the ear 40*b* with fasteners (not shown) and the end 2022 can be secured with fasteners (not shown) to a portion of the ladder dock 90 distal from the ear 40*b*. The guide rail 2020 can approximately define an upside-down "U" shape or "V" shape. In some aspects, as shown, a horizontal member 2023 can extend from the end 2021 to the end 2022 and the guide rail 2020 can thereby form a closed shape. A portion of the guide rail 2020 proximate to the end 2021 can be angled with respect to the vertical by an angle 2027, and the second end 2026 or top of the guide rail 2020 can be rounded and can define a radius R2020 as shown.

The parapet descent apparatus 2000*c* can comprise a support arm 2030, which can be configured to mount to a side surface 59 of the parapet or raised edge 56 and can extend from the ladder dock 90 and thereby stabilize the ladder dock 90. As shown, the support arm 2030 can define a first end 2035 proximate to the ladder dock 90 and a second end 2036 distal from the ladder dock 90. The support arm 2030 can comprise a mounting bracket at either or both ends 2035, 2036. As shown, the support arm 2030 can comprise a mounting bracket 2038*b* at the second end 2036, which can be secured to the side surface 59 with fasteners (not shown). The support arm 2030 can support any loads applied to the ladder dock, including from the parapet ladder 2010 and when the ladder dock 90 overhangs at least in part in cantilever fashion past the raised edge 56 and beyond the top surface 57.

Figure 18:
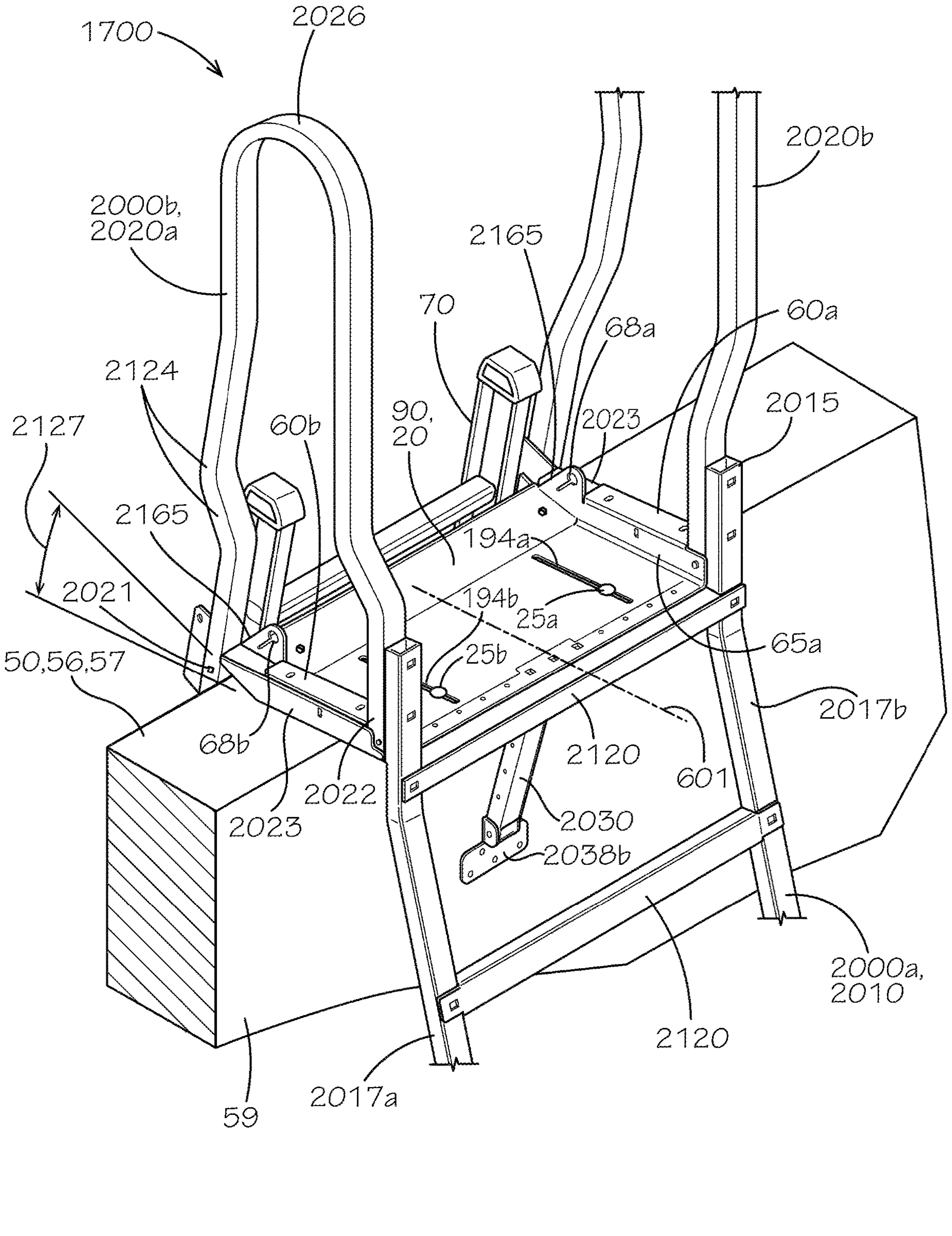
FIG. 18 is a rear perspective view of the ladder dock system of FIG. 17.

FIG. 18 is a rear perspective view of the ladder dock system 1700 of FIG. 17. The parapet ladder 2010 can comprise one or more rungs 2120 extending from the first ladder rail 2017*a* to the second ladder rail 2017*b*. As shown, the first end 2015 of the parapet ladder 2010 can be secured to guide rails 2020*a,b*, one of which can be positioned and secured on each side of the ladder dock 90. As shown, guide rails such as either or both of the guide rails 2020*a,b* can define bends 2124 resulting in the second end 2026 or top portion of the guide rails 2020*a,b* being offset away from the line of symmetry 601 of the ladder dock 90. Since a user of the ladder dock system 1700 can be accompanied by tools or equipment, such an offset on one or both sides can facilitate passage across the ladder dock 90 from the ladder 70 to the parapet ladder 2010 by increasing a space or distance between the guide rails 2020*a,b*.

As shown, in a similar way that the connecting panel 20 can be angled, an end of the horizontal member 2023 of the guide rail 2020*a* and any other of the guide rails 2020 can be angled with respect to the horizontal at an angle 2127 to provide clearance for the lip 65 (shown in FIG. 4) when present. The ladder dock 90 can be secured to the horizontal member 2023 of each of the guide rails 202*a,b* with fasteners (not shown) extending through the auxiliary panels 60*a,b* and the corresponding horizontal members 2023. As shown, the retaining openings 68*a,b* can be defined in the connecting panels 65*a,b* (65*b* shown in FIG. 2) and, more specifically, in tabs 2165 formed from same.

Figure 19:
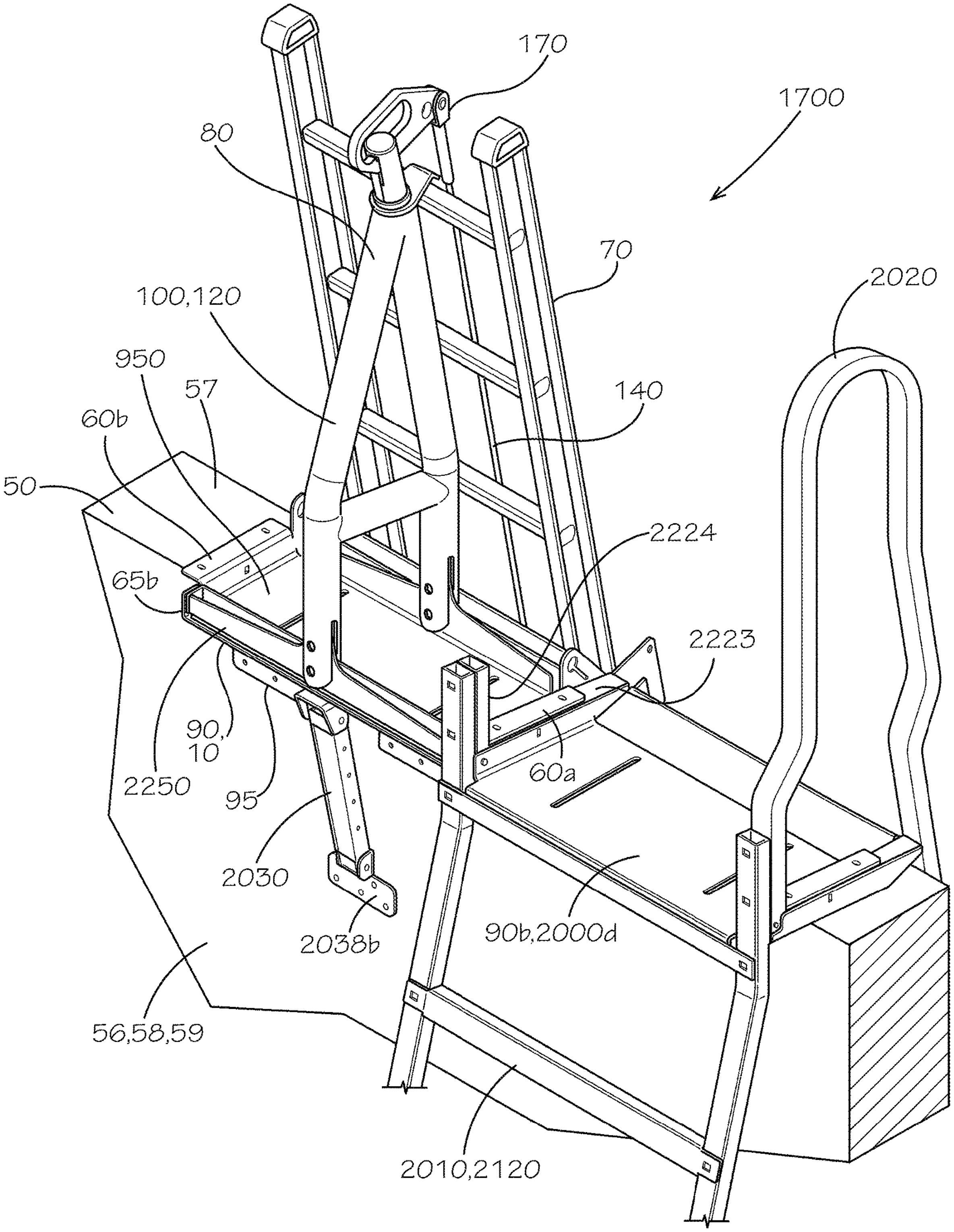
FIG. 19 is a rear perspective view of the ladder dock system of FIG. 17 and the fall arrest system of FIG. 1 in accordance with another aspect of the current disclosure.

FIG. 19 is a rear perspective view of the ladder dock system 1700 and the fall arrest system 1000 in accordance with another aspect of the current disclosure. As shown and as previously described, the upper anchor 120 of the fall arrest device 100 of the fall arrest system 1000 can be secured to the ladder dock 90. The base 950 of the upper anchor 120 can comprise a reinforcement member 2250, including at an end of the ladder dock 90 distal from the ladder 70. The reinforcement member 2250 can be secured to one or more adjoining panels such as, for example and without limitation, the mounting panel 10, the connecting panels 65*a,b* (65*a* shown in FIG. 18), and the auxiliary panels 60*a,b*, through and using any one or more of the openings shown.

As shown, a center of the parapet ladder 2010 can be offset from a center of the ladder dock 90, including when the fall arrest device 100 is secured to the ladder dock 90. Also as shown, a parapet descent apparatus 2000*d* can comprise a ladder dock 90*b*, which can be a second ladder dock and can incorporate any or all of the same features as defined in or comprised in the ladder dock 90, and which can be positioned adjacent to the ladder dock 90. Any of the parapet ladder 2010, the guide rail 2020 (on one side of the ladder dock 90*b* as shown or on both sides of the ladder dock 90*b*), and the support arm 2030 (shown attached to the ladder dock 90) can be mounted to the second ladder dock 90*b* and facilitate a user's passage over the wall 58 and down the ladder 70 or the parapet ladder 2010. The second ladder dock 90*b* can be secured to the ladder dock 90, including with fasteners extending through panels such as the auxiliary panel 60*a* of the ladder dock 90 and a similar auxiliary panel (not shown) of the ladder dock 90*b* or a horizontal member 2223 shown, which can be used independent of a guide rail. As shown, the ladder dock 90*b* can comprise a vertical member 2224, to which the parapet ladder 2010 can be secured with fasteners (not shown). The ladder dock 90*b* itself can be attached to the wall 58 in a similar fashion as the ladder dock 90, with or without the bracket 95 (shown attached to the ladder dock 90).

Figure 20:
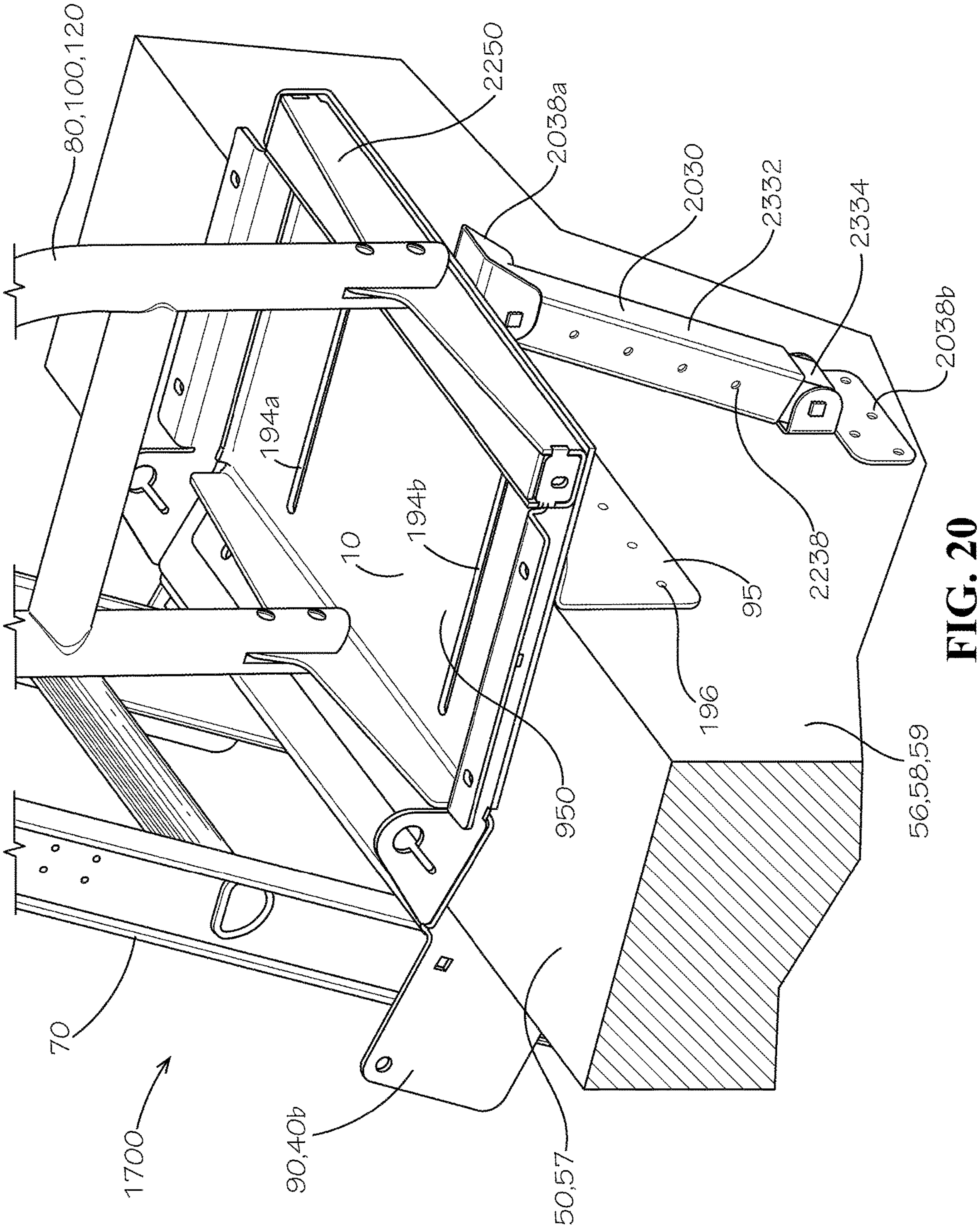
FIG. 20 is a side rear perspective view of the ladder dock of FIG. 1 in accordance with another aspect of the current disclosure.

FIG. 20 is a side rear perspective view of the ladder dock system 1700 comprising the ladder dock 90 together with the upper anchor 120 of the fall arrest device 100 in accordance with another aspect of the current disclosure. As shown, the support arm 2030 can be secured to the side surface 59 of the wall 58 with the mounting bracket 2038*b*. The support arm 2030 can also be secured to the ladder dock 90 with the mounting bracket 2038*a*. The support arm 2030 can comprise a first extension member 2332 and, optionally, a second extension member 2334 received within, as shown, or about the first extension member 2332. Fasteners (not shown) can extend through holes 2238 defined in the first extension member 2332 and holes (not shown) in the second extension member 2334 for locking an extension setting or length of the support arm 2030. As shown, the mounting brackets 2038*a,b* can be hingedly mounted to the first extension member 2332 and the second extension member 2334, respectively. The mounting bracket 2038*a* can be mounted to either or both of the mounting panel 10 of the ladder dock 90 and the reinforcement member 2250 of the base 950 of the fall arrest device 100. In some aspects, as shown, the support arm 2030 can be used together with the bracket 95, which can define mounting openings 196 therein.

Any of the parapet descent apparatuses 2000*a,b,c,d* including, for example and without limitation, the parapet ladder 2010, the guide rails 2020, the support arm 2030, or the ladder dock 90*b* can be formed at least in part from tubing members, which can be circular or, as shown, approximately square in cross-section (square except for radiused corners as shown), The mounting brackets 2038*a,b* can be formed monolithically from a blank.

A method of using the fall arrest system 80 can comprise securing the upper anchor 120 to the elevated structure 50. The method can comprise securing the ladder 70 to the elevated structure 50 proximate to the upper anchor 120. The method can comprise securing the lower anchor 110 to the ladder 70, which can comprise adjusting the lower anchor width 1007 (shown in FIG. 10) to match the ladder width 907 (shown in FIG. 9) and tightening a fastener such as the fastener 970 joining the second portion 112 to the first portion 111. The method can comprise extending the cable 140 between the lower anchor 110 and the upper anchor 120. The method can comprise securing the safety harness 1520 of a user to the cable 140. The method can comprise securing the safety harness 1520 of a user to the cable 140 with a removable cam fitting such as, for example and without limitation, the cable sleeve 1510. The method can comprise arresting a fall of a user tethered to the cable 140 by activating the shock absorber 270 of the upper anchor 120.

The method can comprise securing the cable 140 inside a cable attachment 160 of the lower anchor 110. More specifically, the method can comprise tightening a locking fastener 990 of the cable attachment 160 against the cable 140. The method can comprise extending the pins 1050*a,b* through the lower anchor 110 and the ladder rung 72 of the ladder 70. Extending the pins 1050*a,b* through the lower anchor 110 and the ladder rung 72 can comprise extending the pins 1050*a,b* through the slots 910*a,b* for initial positioning of the lower anchor 110 and tensioning of the cable 140. The method can comprise securing a position of a portion of the cable 140 relative to the lower anchor 110 with the locking fastener 990 of the lower anchor 110. The method can comprise securing a position of a portion of the cable 140 relative to the lower anchor 110 with the locking fastener 990 of the lower anchor 110 before securing the lower anchor 110 to the ladder 70 with the pin 1050*a,b*. Extending the pins 1050*a,b* through the lower anchor 110 and the ladder rung 72 can comprise extending the pins 1050*a,b* through the slots 910*a,b* for further positioning of the lower anchor 110 and further tensioning of the cable 140. The method can comprise securing the lower anchor 110 to the ladder 70 with a pin 1050*a,b* to prevent movement of the lower anchor 110 with respect to the ladder 70 in the longitudinal direction 901 of the ladder 70.

It is contemplated that either the upper anchor 120 or the lower anchor 110 can be used alone with the cable 140 and, whether used separately or in combination, can be used with or without the ladder dock 90. While a leaning and portable ladder 70 is shown in the figures, the disclosed fall arrest system 80 and in particular a portion or all of the fall arrest device 100 can be installed on a ladder that is fixed to the elevated structure 50 or to a separate structure providing access to the elevated structure 50. The ladder 70, as a portable ladder, can provide temporary access to the elevated structure 50 in that it can be selectively positioned against the elevated structure 50 and then, after it is no longer needed, easily stored elsewhere.

Any of the structures of the fall arrest system 80 can be formed from a non-metallic material such as, for example and without limitation, a reinforced fiberglass or polymer or from a metallic material such as steel. A paint coating or powder coating or use of corrosion resistant materials can facilitate use of the fall arrest system 80 for extended periods outside without degradation. A portion or all of the fall arrest system 80 can define a surface texture such as a diamond tread pattern for aesthetic reasons or for functional reasons such as to improve skid resistance.

One should note that conditional language, such as, among others, “can,” “could,” “might,” or “may,” unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A parapet descent apparatus comprising:

a first ladder dock comprising a mounting panel defining a planar portion, the planar portion configured to be positioned in facing contact with a top surface of a parapet of an elevated structure and secured to an inner side surface of a parapet of an elevated structure through a bracket coupled to the mounting panel and contacting the inner side surface of the parapet, the first ladder dock comprising a ladder rest panel extending from the mounting panel and ears extending from the ladder rest panel at an angle from the ladder rest panel, the first ladder dock configured to receive a rigid, portable ladder between the ears and the ladder rest panel configured to contact the portable ladder between the ears, the portable ladder being configured to provide temporary access to the elevated structure, each of the ears joined to the ladder rest panel at a bend between the ladder rest panel and the corresponding ear; the first ladder dock further comprising a stop panel extending directly from one of a) a side of the mounting panel nearest to the portable ladder and b) the ladder rest panel, the stop panel angled with respect to the mounting panel and extending downward, the stop panel configured to contact the elevated structure and thereby prevent rotation and/or translation of the ladder dock with respect to the elevated structure; the first ladder dock being formed from a single blank; and a parapet ladder secured to the first ladder dock and comprising:

a first ladder rail;

a second ladder rail, the parapet ladder configured to face the inner side surface of the elevated structure; the mounting panel configured to slidably receive the bracket when the mounting panel is secured to the inner side surface of the parapet through the bracket; and a plurality of rungs, each of the plurality of rungs extending from the first ladder rail to the second ladder rail, the parapet ladder defining a first end configured to be secured to the parapet of the elevated structure and a second end distal from the first end, the top surface of the parapet being offset above a roof surface of the elevated structure by a wall height of the parapet.

2. The parapet descent apparatus of claim 1, further comprising the bracket, the bracket coupled to a lower surface of the mounting panel, the bracket configured to support a cantilevered portion of the mounting panel.

3. The parapet descent apparatus of claim 1, wherein the ladder dock is configured to receive a rigid, portable ladder, the ladder being configured to provide temporary access to the elevated structure.

4. The parapet descent apparatus of claim 1, wherein a portion of the first ladder rail and the second ladder rail of the parapet ladder between the first end and the second end is angled with respect to the vertical when installed on the elevated structure.

5. The parapet descent apparatus of claim 1, further comprising a guide rail secured to at least one of the parapet ladder and the mounting panel.

6. The parapet descent apparatus of claim 1, further comprising a pair of guide rails, a respective guide rail of the pair of guide rails positioned and secured on each side of the parapet ladder and the mounting panel, the pair of guide rails defining a space therebetween for passage of a user of the parapet descent apparatus.

7. The parapet descent apparatus of claim 1, wherein the first ladder dock is configured to receive a rigid, portable ladder, the portable ladder being configured to provide temporary access to the elevated structure, the parapet descent apparatus further comprising a second ladder dock comprising a mounting panel, the parapet ladder being secured to the mounting panel of the second ladder dock and through the second ladder dock to the first ladder dock, the parapet ladder offset along a direction of the parapet from the first ladder dock, at least one of the first ladder dock and the second ladder dock configured for passage of a user of the parapet descent apparatus from the portable ladder to the parapet ladder.

8. The parapet descent apparatus of claim 7, wherein a center of the parapet ladder is offset in a left-right direction of the parapet descent apparatus from a center of the first ladder dock.

9. A system comprising:

the parapet descent apparatus of claim 1, and an upper anchor configured to be secured to the top surface of the parapet.

10. The system of claim 9, wherein the mounting panel is configured to be positioned between the top surface of the parapet and the upper anchor and secured to the parapet of the elevated structure.

11. The system of claim 9, further comprising a lower anchor and a cable extending from the upper anchor to the lower anchor, the cable configured to receive a cable sleeve configured to tether a user to the cable, the cable further configured to allow movement of the cable sleeve to any position between the upper anchor and the lower anchor.

12. The parapet descent apparatus of claim 1, wherein the mounting panel is configured to be secured to the top surface of the elevated structure through an opening defined in the mounting panel.

13. A system comprising:

an upper anchor comprising a base extending in a horizontal direction, the base configured to be secured to an upward-facing planar surface of an elevated structure proximate to a portable, rigid ladder accessing the elevated structure, the surface of the elevated structure being one of a horizontal surface and a surface sloped with respect to a horizontal orientation of the system and not defined by the ladder, the upper anchor comprising a shock absorber, the shock absorber comprising a shock absorbing element;

a lower anchor comprising a first portion and a second portion slideably secured to the first portion, each of the first portion and the second portion defining a side flange, the side flange of the first portion configured to face an outer surface of a first rail of the ladder and the side flange of the second portion configured to face an outer surface of a second rail of the ladder, the first portion and the second portion configured to receive the ladder therebetween, the lower anchor configured to not rotate with respect to the ladder; and a cable configured to extend from the upper anchor to the lower anchor, the cable configured to receive a cable sleeve configured to tether a user to the cable, the cable further configured to allow movement of the cable sleeve to any position between the upper anchor and the lower anchor, the shock absorber and the shock absorbing element thereof configured primarily to temporarily move when loaded by a force and to reduce a deceleration of the user when tethered to the cable when the user falls from the ladder and thereby loads the shock absorbing element, the shock absorbing element comprising one of a biasing element and a cylinder.

14. The system of claim 13, wherein the second portion is secured to the first portion with a fastener.

15. The system of claim 13, wherein the lower anchor comprises a locking fastener configured to receive and fix a position of the cable relative to the lower anchor.

16. The system of claim 13, further comprising a pin extending through the lower anchor and into the ladder, the pin preventing movement of the lower anchor with respect to the ladder in a longitudinal direction of the ladder.

17. The system of claim 16, wherein the pin is a quick-release pin.

18. The system of claim 17, wherein the pin comprises a detent.

19. The system of claim 13, wherein the shock absorbing element comprises one of a compression spring and a gas cylinder.

20. The system of claim 13, wherein the upper anchor further comprises a frame extending in a vertical direction from the base.

21. A parapet descent apparatus comprising:

a first ladder dock comprising a mounting panel configured to be positioned in facing contact with a top surface of a parapet of an elevated structure and secured to an inner side surface of a parapet of an elevated structure through one of a support arm and a bracket coupled to the mounting panel, the first ladder dock being formed from a single blank; and a parapet ladder secured to the first ladder dock and comprising:

a first ladder rail;

a second ladder rail, the parapet ladder configured to face the inner side surface of the elevated structure; a first end of the support arm hingedly mounted to the mounting panel when the mounting panel is secured to the inner side surface of the parapet through the support arm, the first end of the support arm extending from a portion of the mounting panel that is proximate to where the parapet ladder is secured to the mounting panel; and the bracket slideably mounted to the mounting panel when the mounting panel is secured to the inner side surface of the parapet through the bracket, the bracket extending from a portion of the mounting panel that is proximate to where the parapet ladder is secured to the mounting panel; and a plurality of rungs, each of the plurality of rungs extending from the first ladder rail to the second ladder rail, the parapet ladder defining a first end configured to be secured to the parapet of the elevated structure and a second end distal from the first end, a top surface of the parapet being offset above a roof surface of the elevated structure by a wall height of the parapet; and a second ladder dock comprising a mounting panel;

wherein:

the first ladder dock is configured to receive a rigid, portable ladder, the portable ladder being configured to provide temporary access to the elevated structure, the parapet ladder being secured to the mounting panel of the second ladder dock and through the second ladder dock to the first ladder dock, the parapet ladder offset along a direction of the parapet from the first ladder dock, at least one of the first ladder dock and the second ladder dock configured for passage of a user of the parapet descent apparatus from the portable ladder to the parapet ladder; and a center of the parapet ladder is offset in a left-right direction of the parapet descent apparatus from a center of at least one of the first ladder dock and the second ladder dock.

* * * * *